(12) United States Patent
Lin et al.

(10) Patent No.: US 10,541,599 B2
(45) Date of Patent: Jan. 21, 2020

(54) SOFT-START CONTROL CIRCUIT APPLIED TO DC-DC CONVERTING SYSTEM

(71) Applicant: Raydium Semiconductor Corporation, Hsinchu (TW)

(72) Inventors: Shen-Xiang Lin, Taipei (TW); Hsuan-Hao Chien, Taipei (TW); Chih-Jen Hung, Taipei (TW)

(73) Assignee: Raydium Semiconductor Corporation, Hsinchu (TW)

(*) Notice: Subject to any disclaimer, the term of this patent is extended or adjusted under 35 U.S.C. 154(b) by 0 days.

(21) Appl. No.: 16/412,614

(22) Filed: May 15, 2019

(65) Prior Publication Data

US 2019/0356215 A1 Nov. 21, 2019

Related U.S. Application Data

(60) Provisional application No. 62/674,344, filed on May 21, 2018.

(51) Int. Cl.
*H02M 1/32* (2007.01)
*H02M 1/36* (2007.01)
*G05F 1/46* (2006.01)
*H02M 3/158* (2006.01)

(52) U.S. Cl.
CPC ............. *H02M 1/32* (2013.01); *G05F 1/468* (2013.01); *H02M 1/36* (2013.01); *H02M 3/1584* (2013.01); *H02M 2003/1586* (2013.01)

(58) Field of Classification Search
CPC ............ H02M 1/32; H02M 1/36; H02M 1/42; H02M 3/156–158; H02M 3/1584; H02M 3/1588; H02M 2003/1586; G05F 1/445; G05F 1/455; G05F 1/468
USPC ......................... 323/238, 242, 243, 246, 247
See application file for complete search history.

(56) References Cited

U.S. PATENT DOCUMENTS

| | | | | |
|---|---|---|---|---|
| 8,853,980 B2 * | 10/2014 | Chang | ........................ | H02P 6/16 318/400.06 |
| 9,000,742 B2 * | 4/2015 | Chen | ........................ | G05F 1/56 323/265 |
| 2007/0146006 A1 * | 6/2007 | Dequina | ................. | H02M 1/36 326/62 |
| 2008/0129265 A1 * | 6/2008 | Rosenthal | ............. | H02M 3/156 323/283 |
| 2013/0271104 A1 * | 10/2013 | Fu | ............................. | G05F 3/08 323/299 |
| 2013/0285626 A1 * | 10/2013 | Chen | ....................... | H02M 1/32 323/271 |

(Continued)

*Primary Examiner* — Yemane Mehari

(57) ABSTRACT

A soft-start control circuit includes first to third inverters, first to third comparators, first to fourth resistors, first to fourth D-type flip-flops and a NOR gate. The first comparator outputs a first trigger signal. The second comparator outputs a second trigger signal. The third comparator outputs a third trigger signal. The first D-type flip-flop outputs a first error amplification ready signal. The second D-type flip-flop outputs a second error amplification ready signal. The third D-type flip-flop outputs a high-level output voltage ready signal. The fourth D-type flip-flop outputs a low-level output voltage ready signal. The NOR gate receives an inverted signal of a high-level output voltage enable signal and the third trigger signal and outputs a high-level output voltage control signal to prevent an inrush current of the DC-DC conversion system during a startup process.

20 Claims, 25 Drawing Sheets

(56) References Cited

U.S. PATENT DOCUMENTS

| | | | |
|---|---|---|---|
| 2015/0042299 A1* | 2/2015 | Li | H02M 1/36 323/271 |
| 2015/0117072 A1* | 4/2015 | Jao | H02M 1/36 363/21.17 |
| 2015/0162830 A1* | 6/2015 | Dong | H02M 1/36 323/271 |
| 2015/0256060 A1* | 9/2015 | Faingersh | H02M 1/36 323/267 |

* cited by examiner

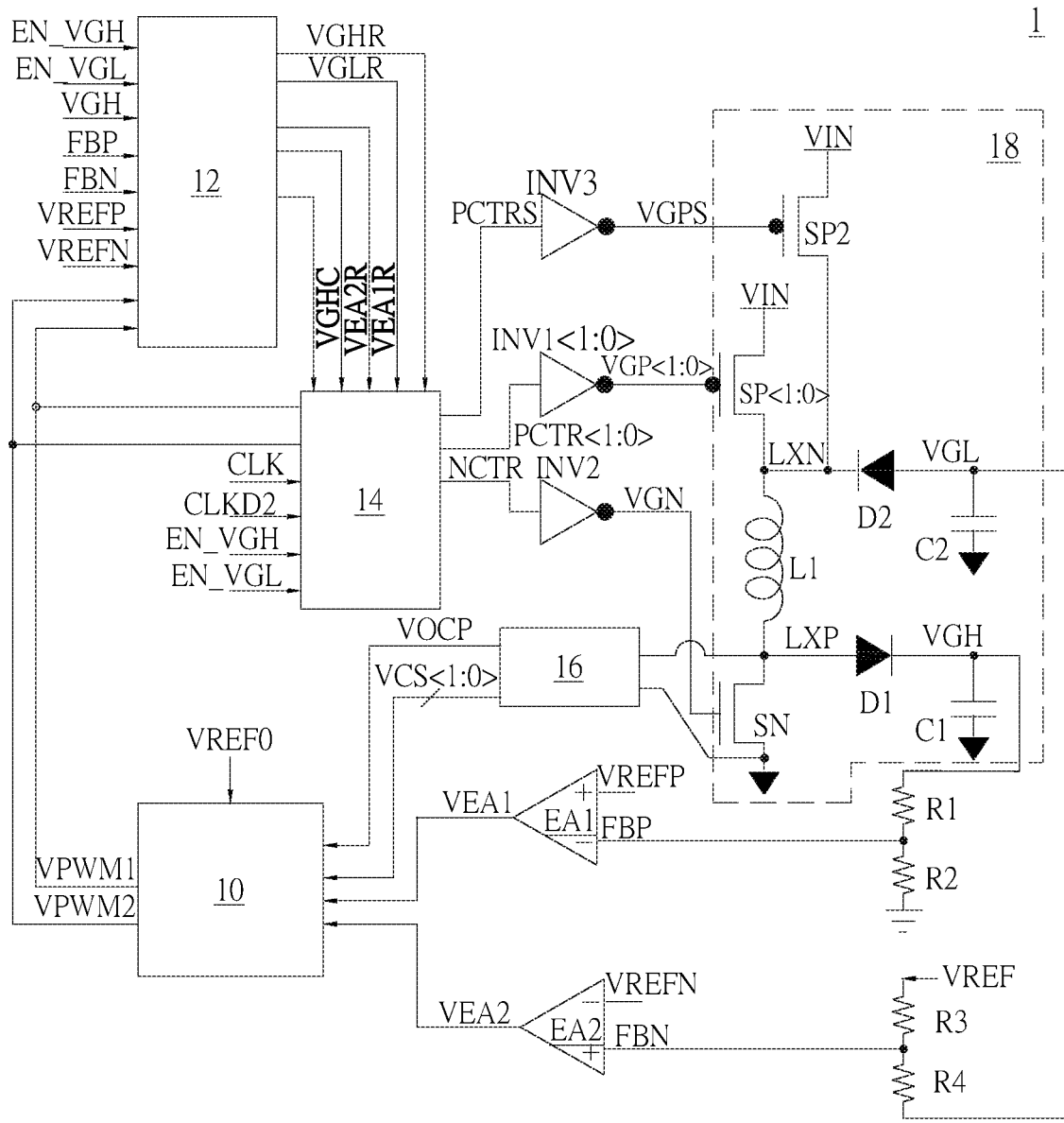
【FIG.1 (PRIOR ART)】

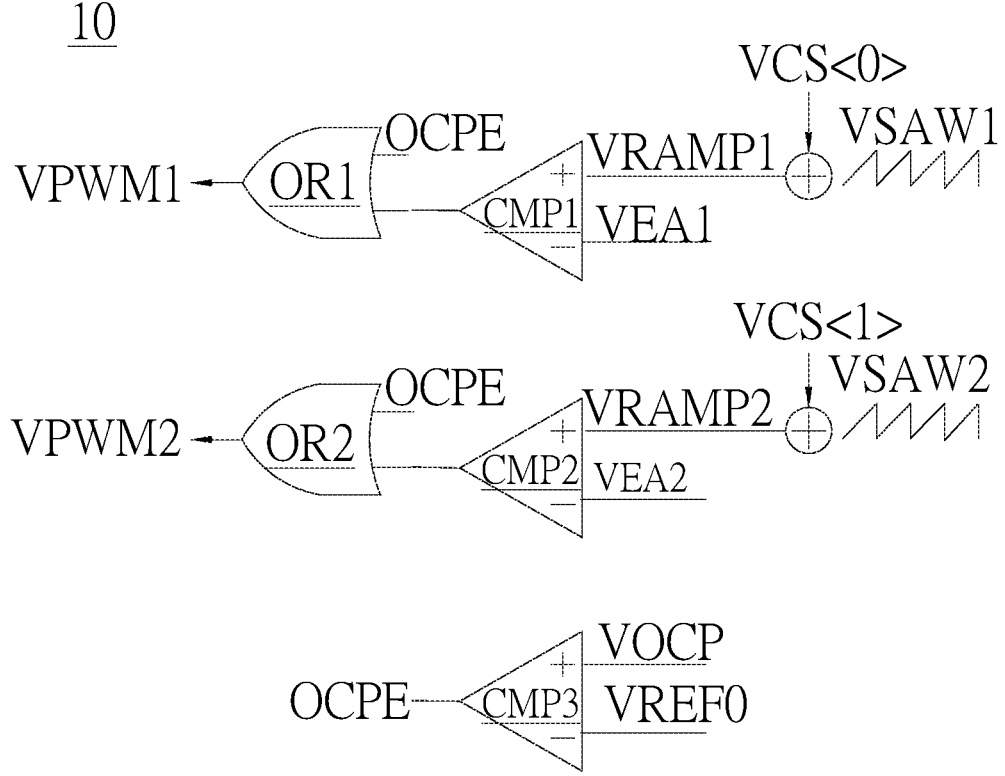
[FIG.2 (PRIOR ART)]

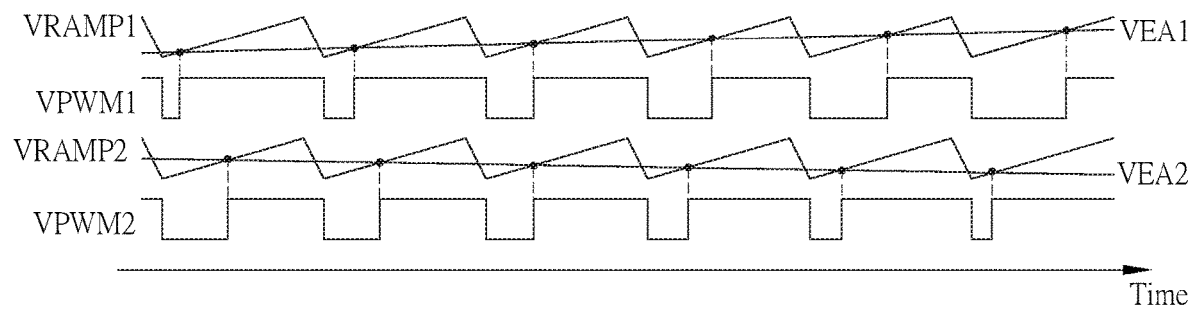
【FIG.3 (PRIOR ART)】

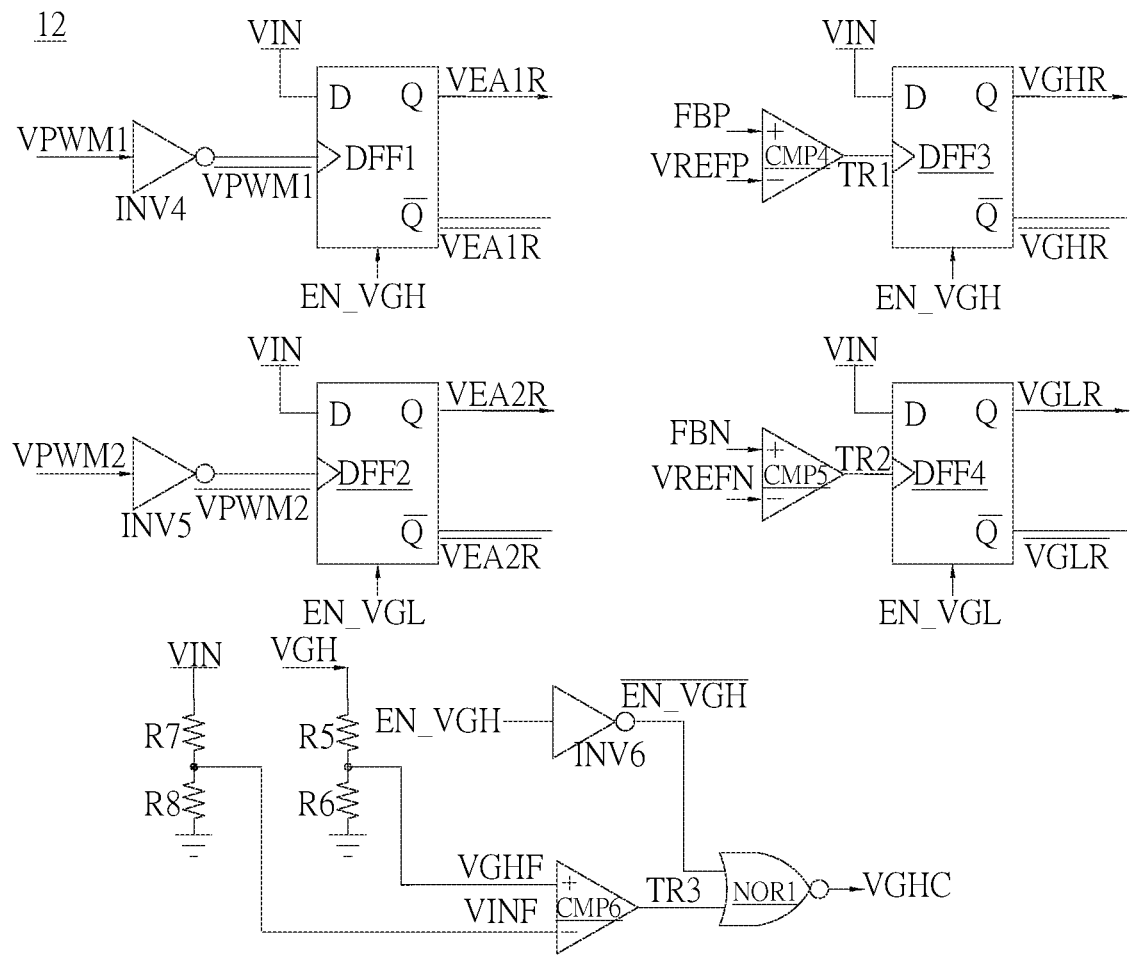
[FIG.4]

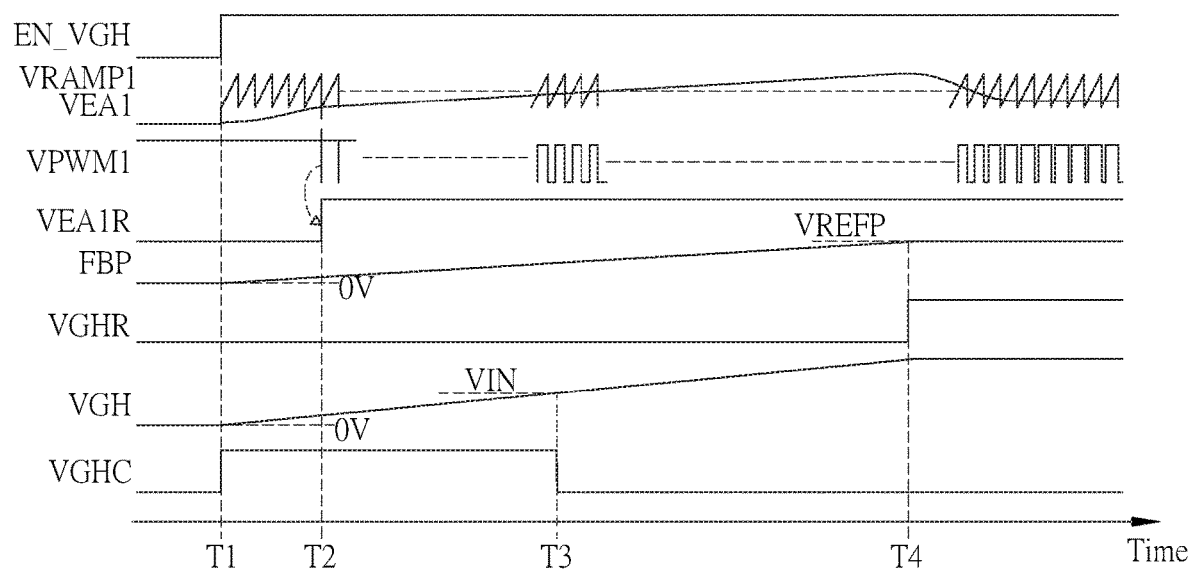
[FIG.5]

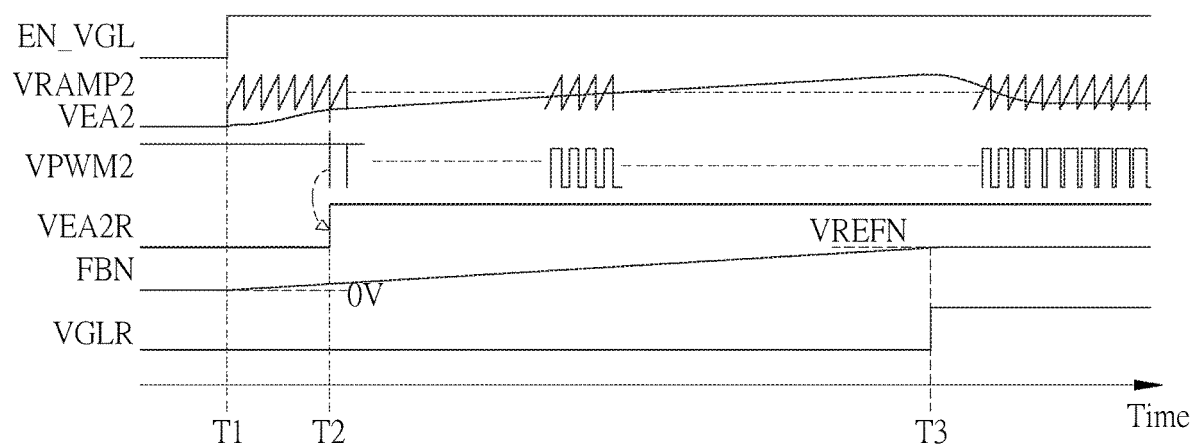
[FIG.6]

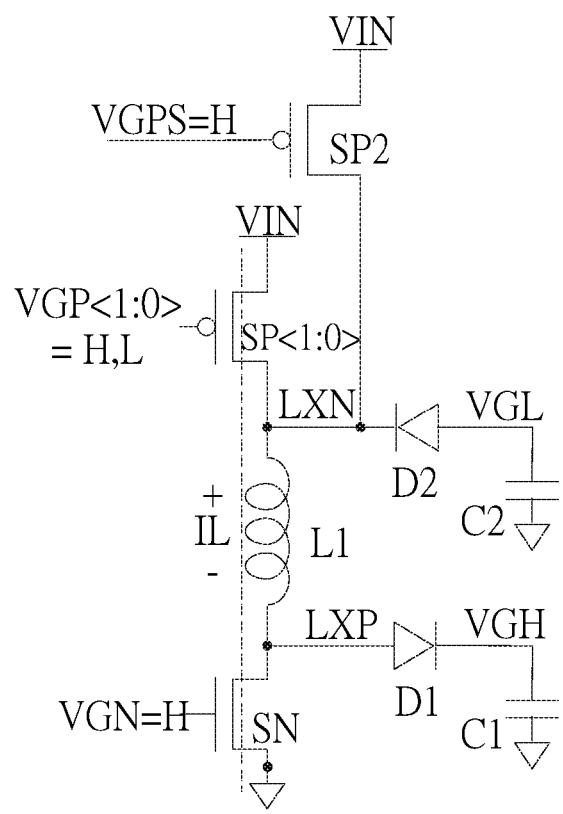 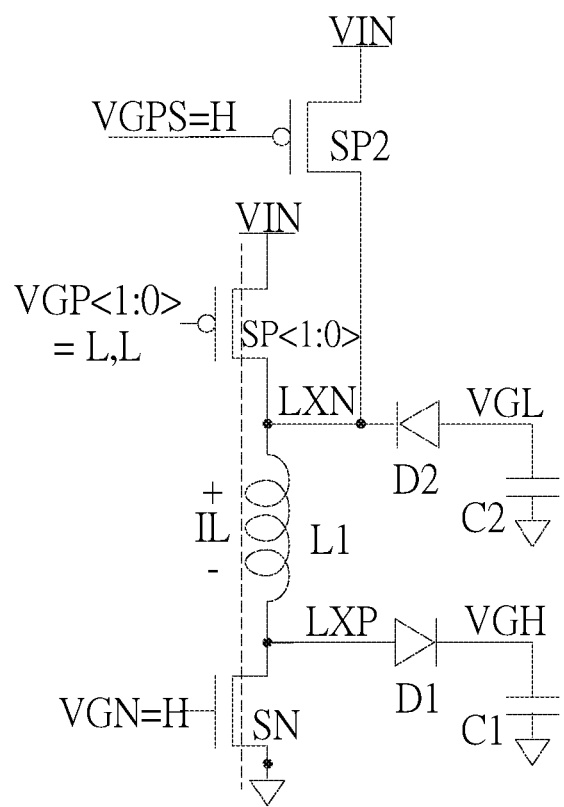
【FIG.7A】  【FIG.7B】

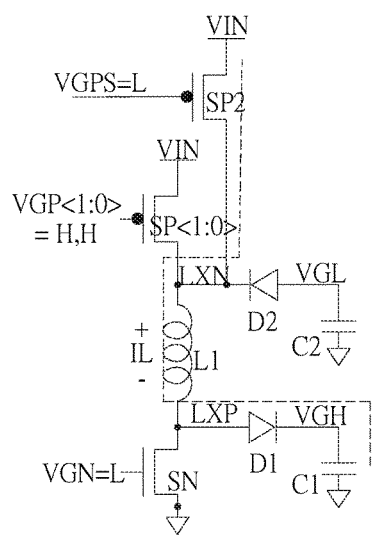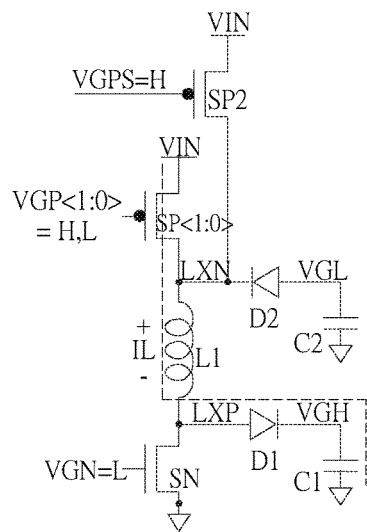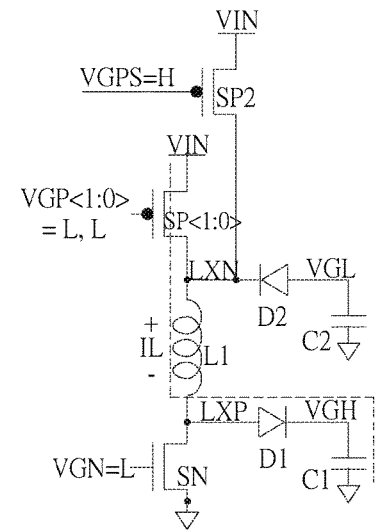
【FIG.8A】　　　　　　【FIG.8B】　　　　　　【FIG.8C】

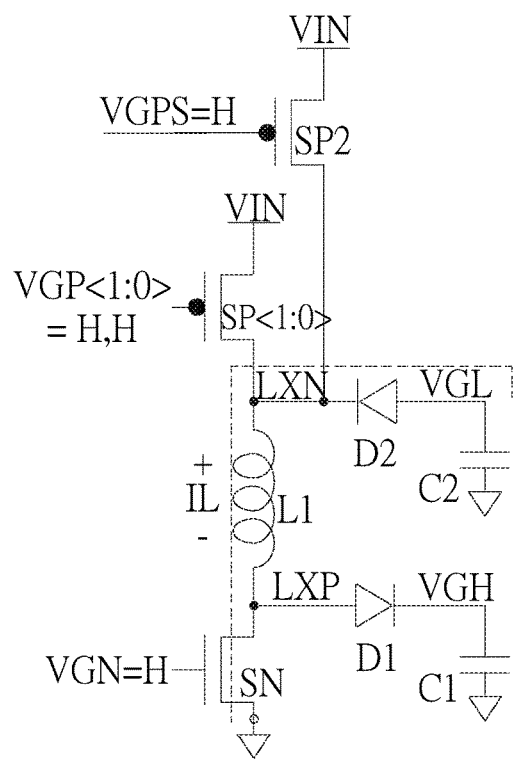
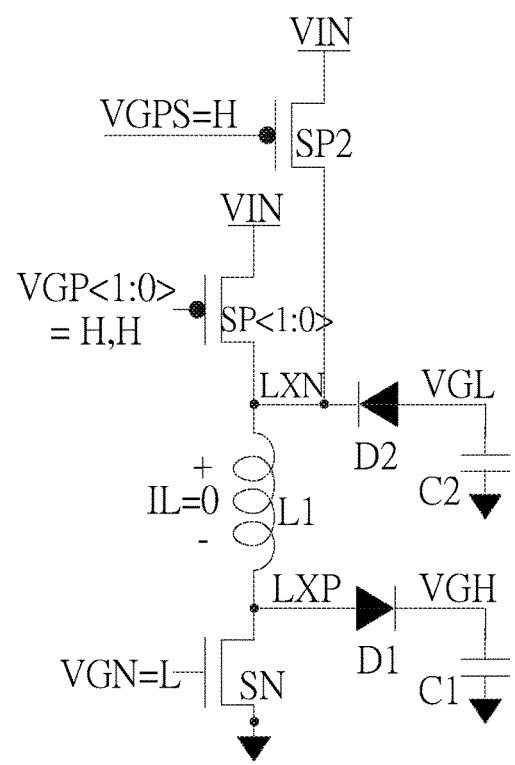
【FIG.9A】 　　　　　　　　　　【FIG.9B】

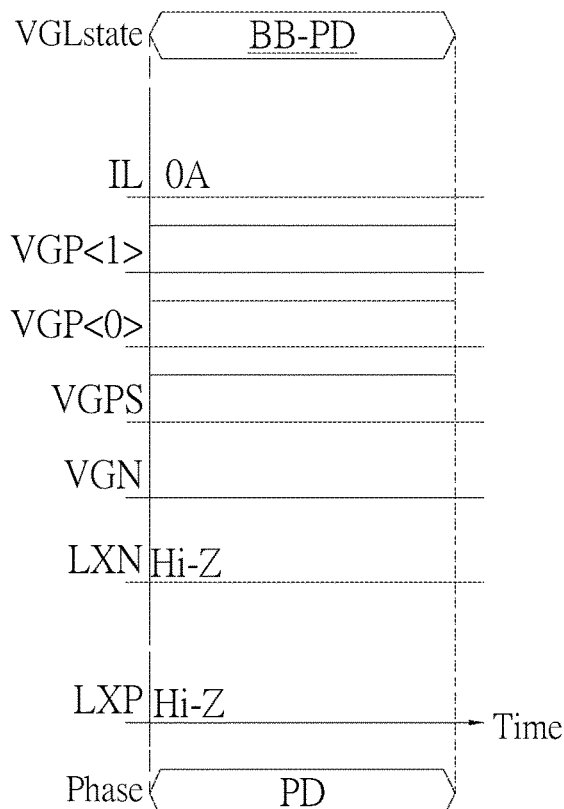
[FIG.10A]
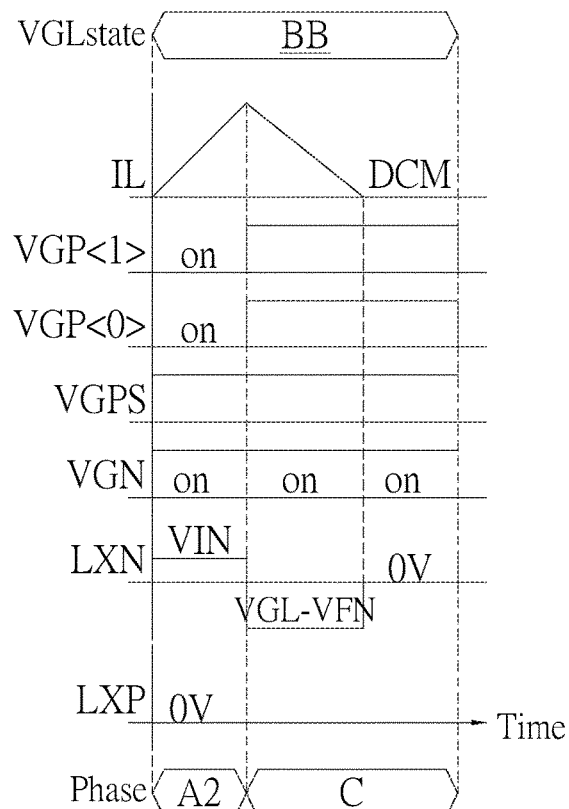
[FIG.10B]

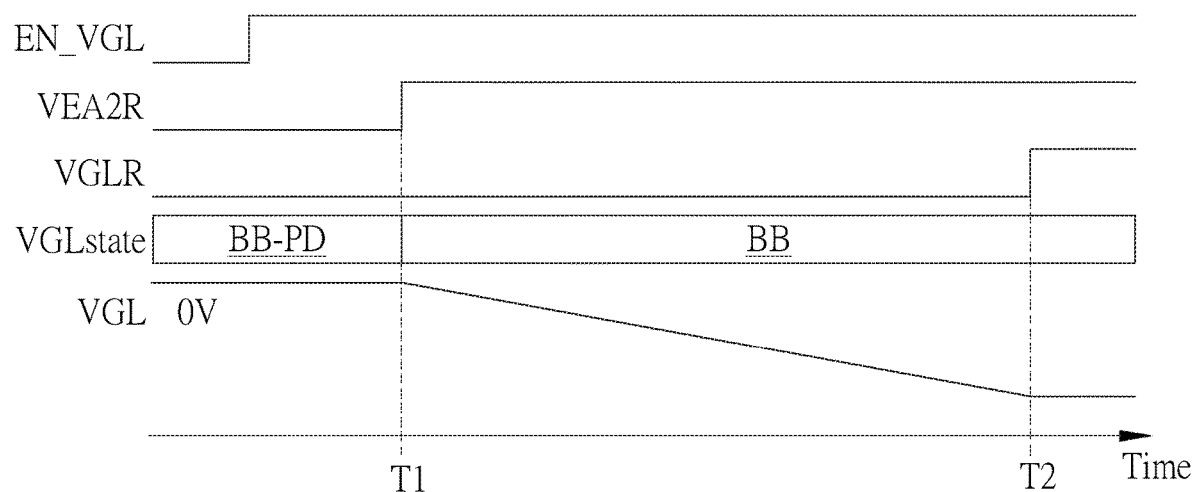
[FIG.11]

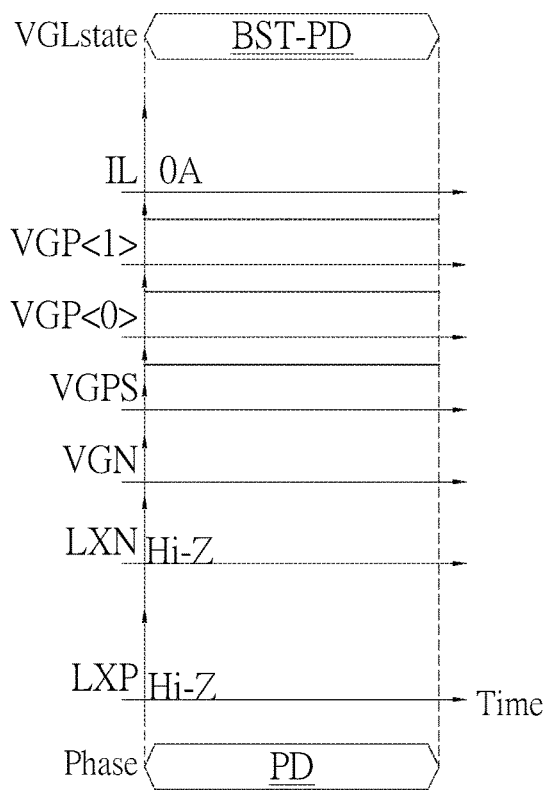
【FIG.12A】
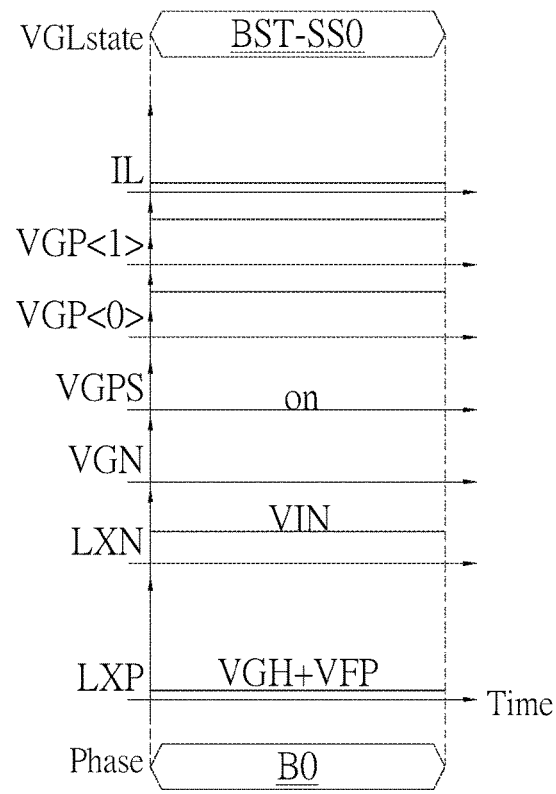
【FIG.12B】

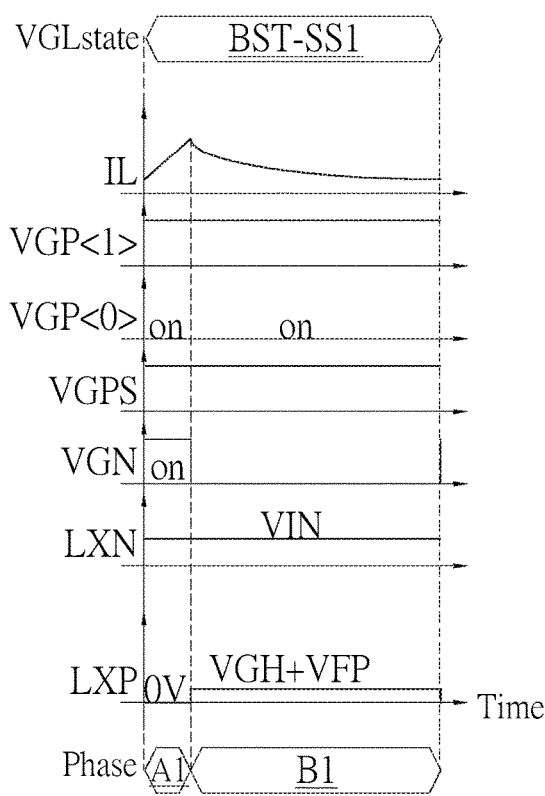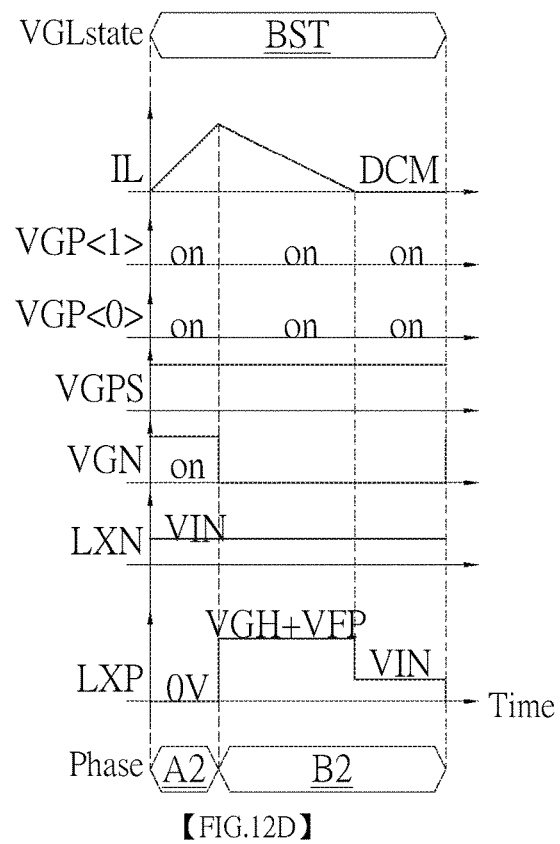
[FIG.12C]  [FIG.12D]

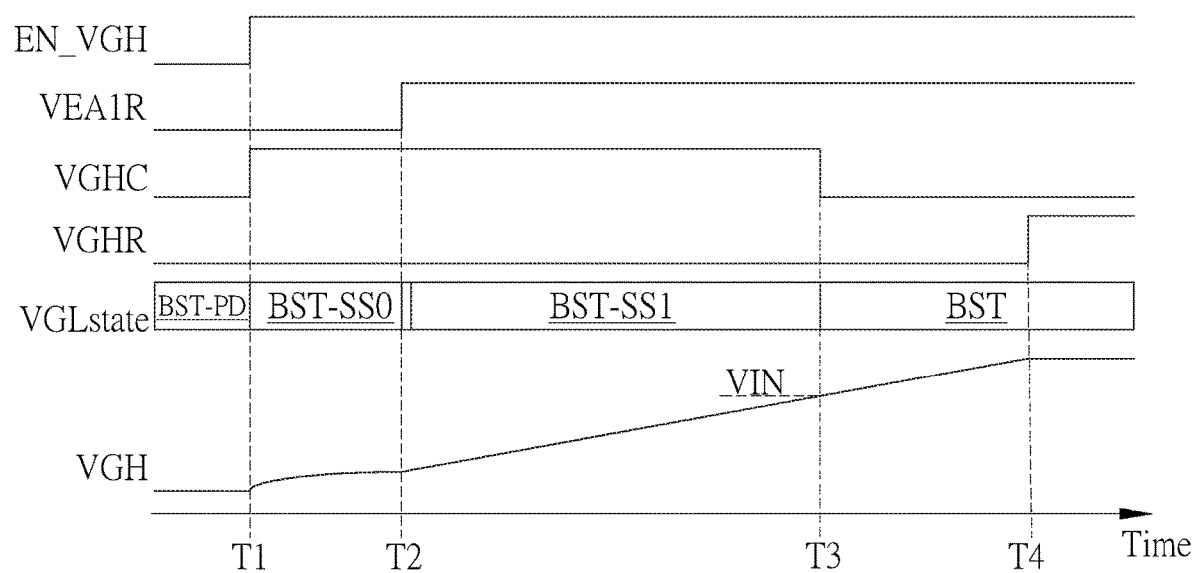
[FIG.13]

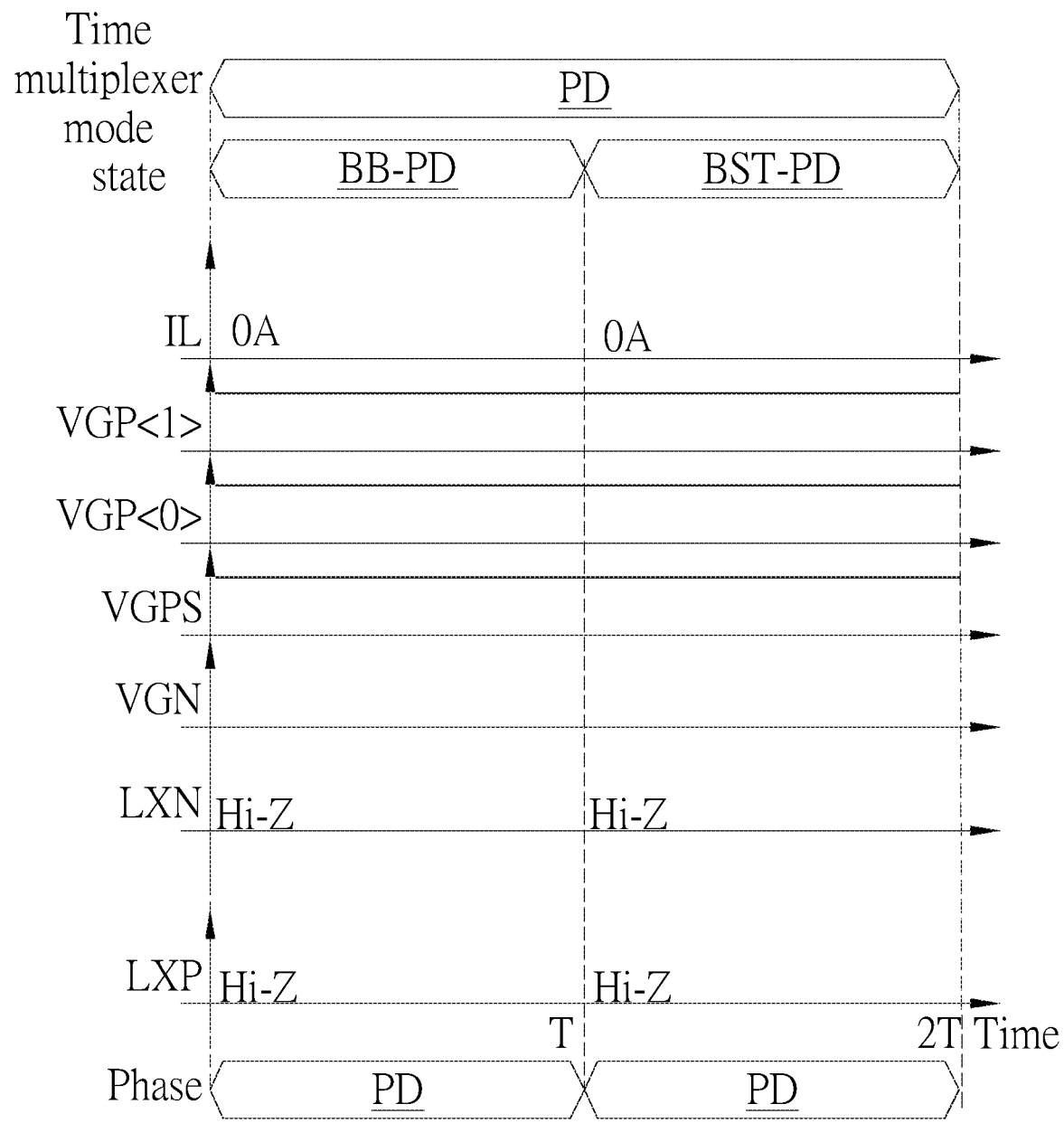
【FIG.14A】

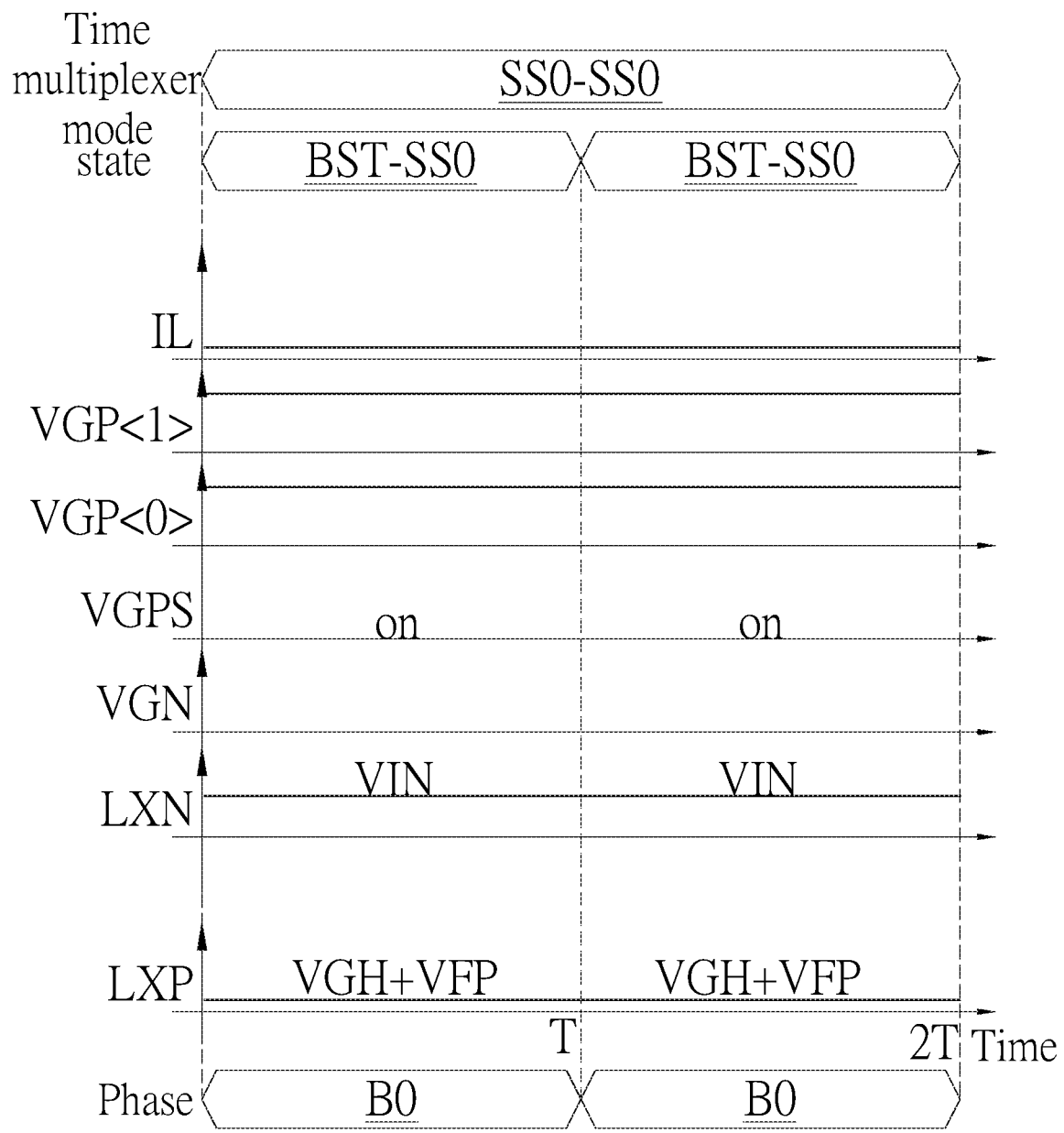
[FIG.14B]

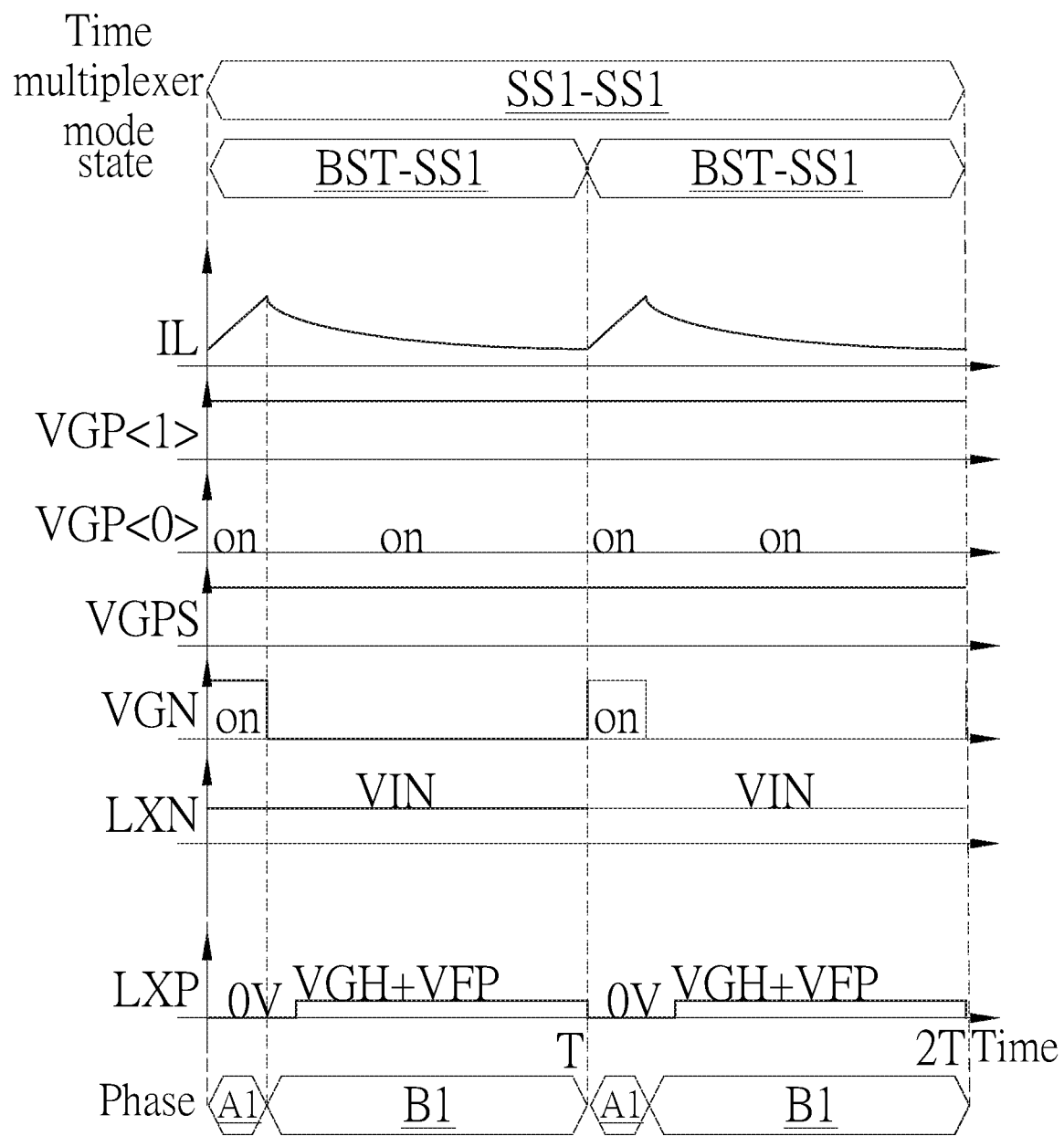
[FIG.14C]

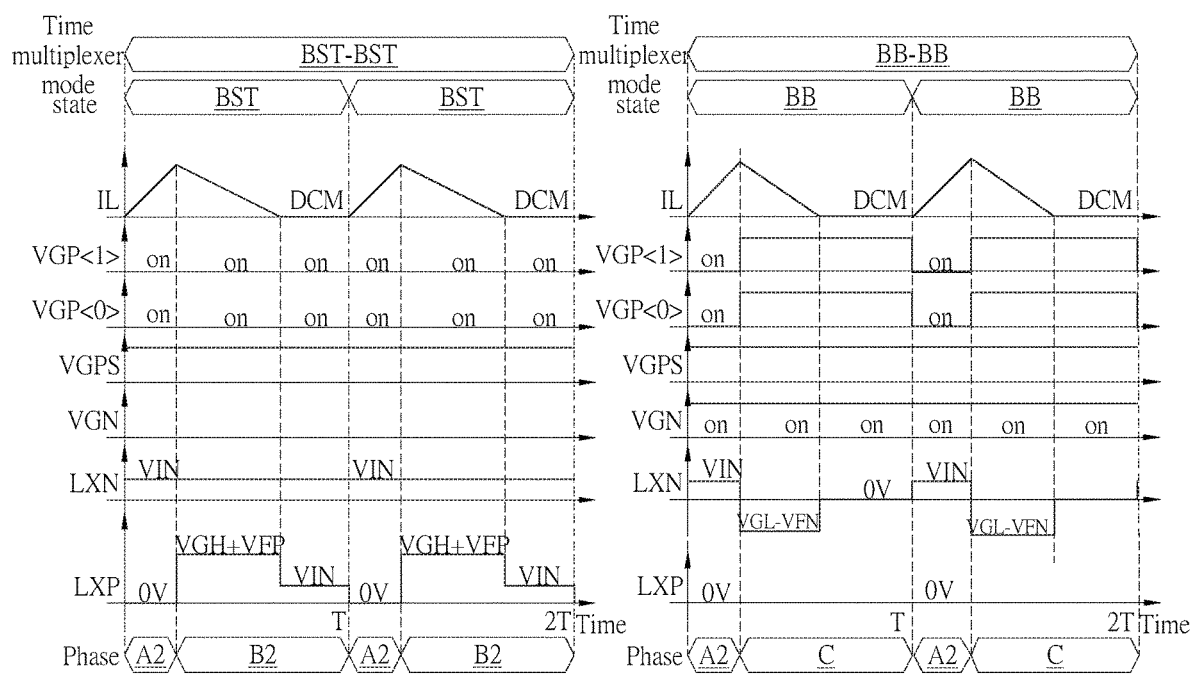
[FIG.15A]   [FIG.15B]

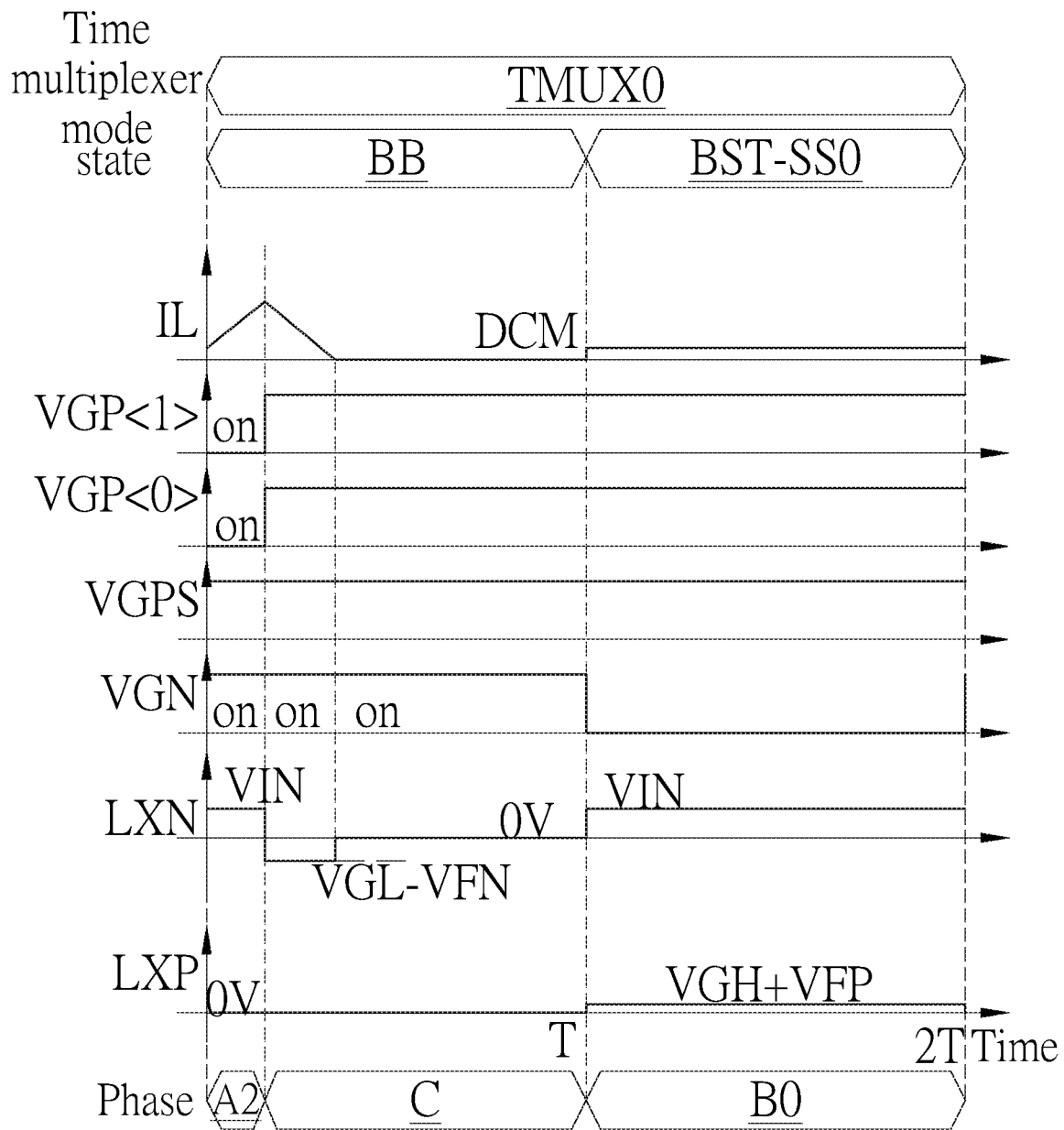
【FIG.16A】

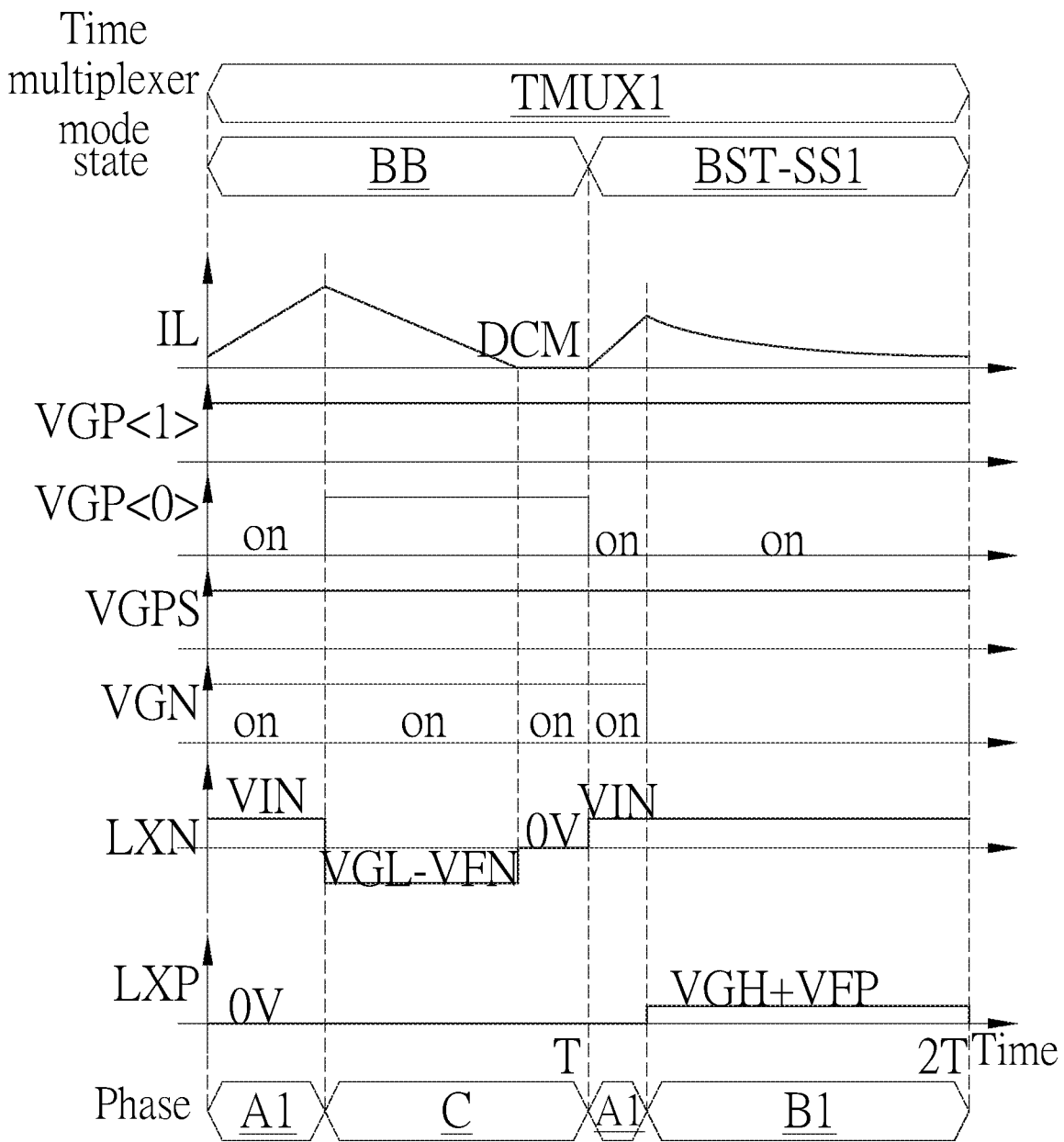
【FIG.16B】

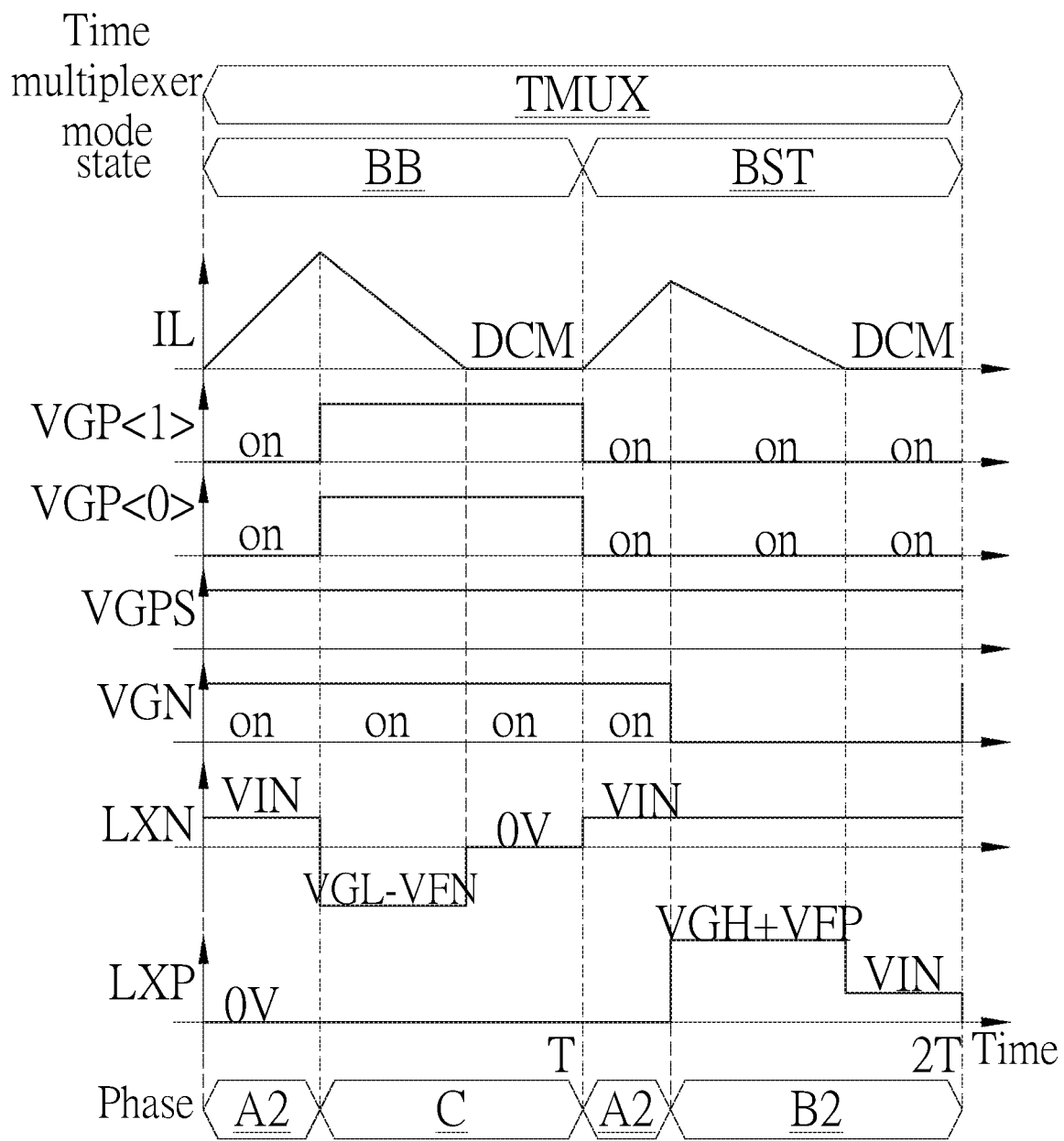
[FIG.16C]

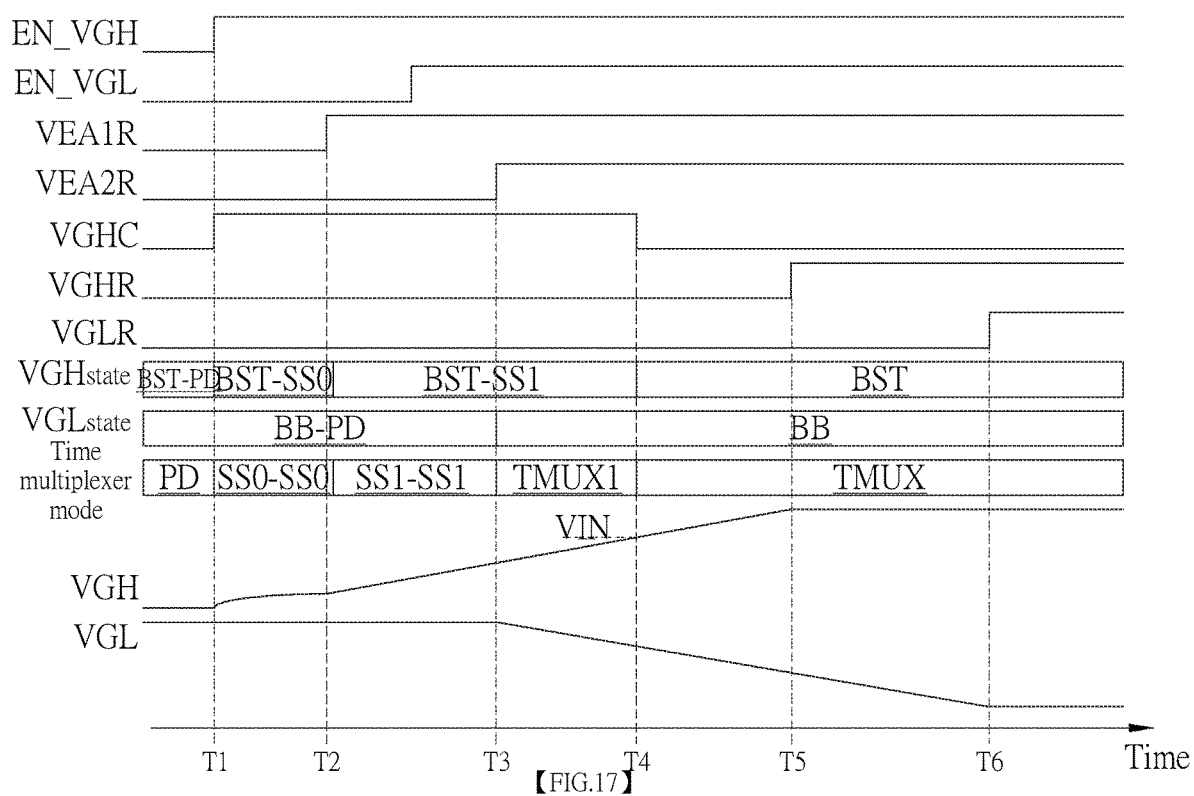
[FIG.17]

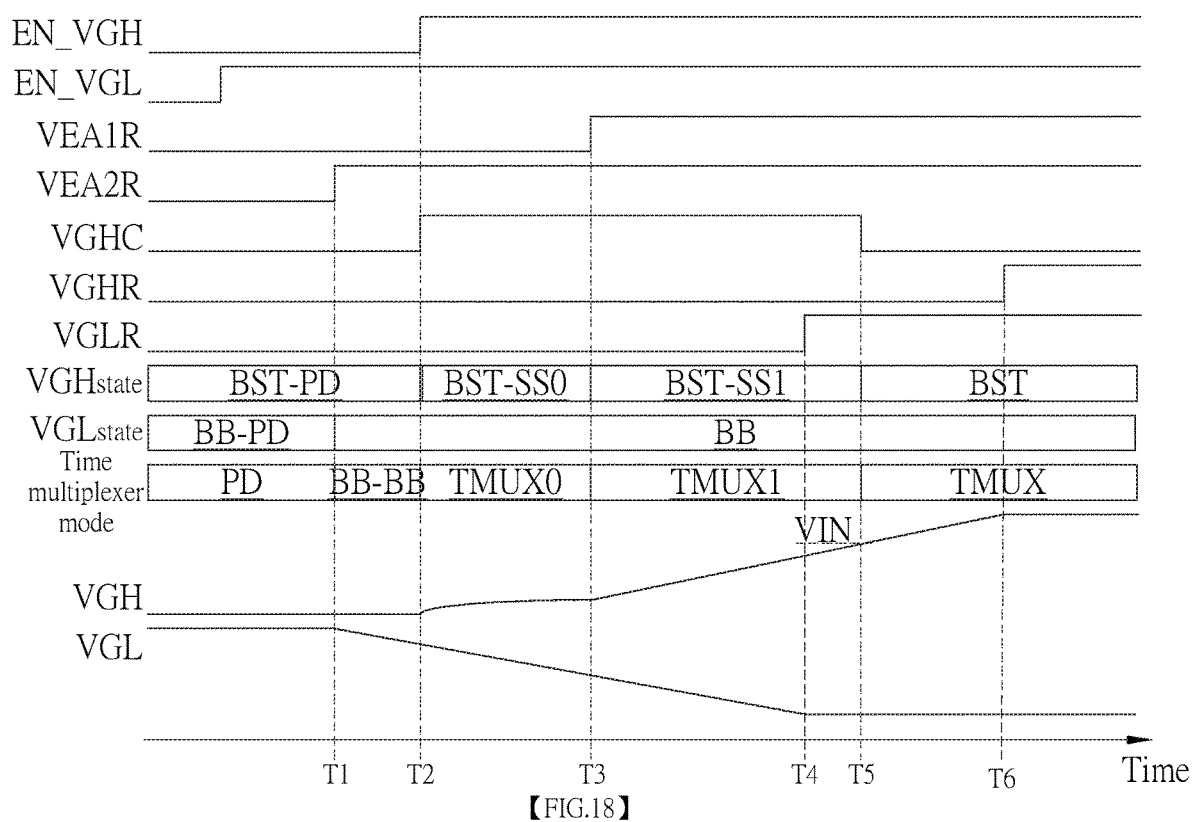
[FIG.18]

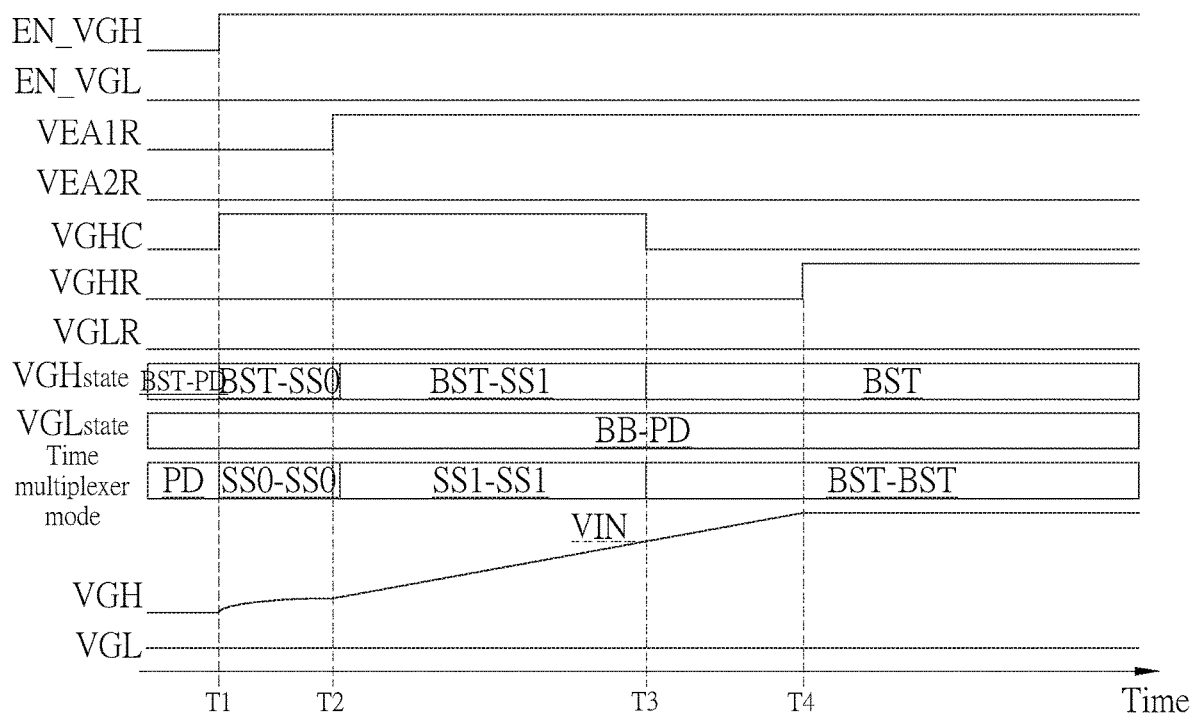
[FIG.19]

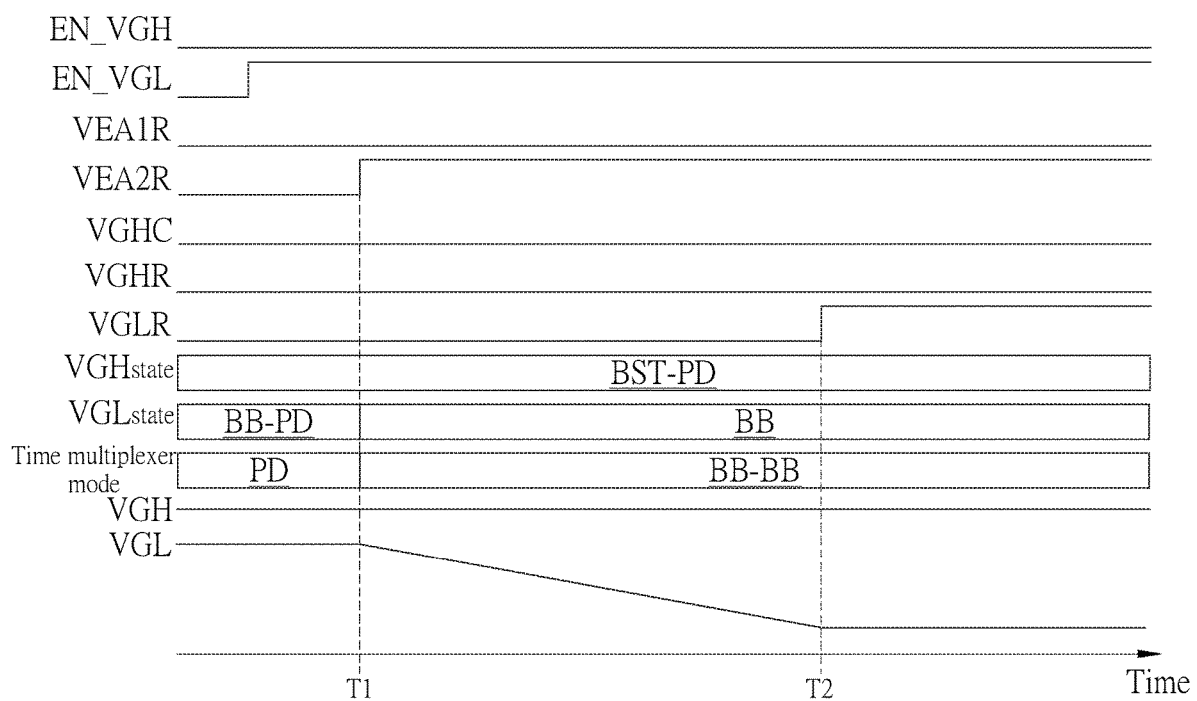
[FIG.20]

SOFT-START CONTROL CIRCUIT APPLIED TO DC-DC CONVERTING SYSTEM

BACKGROUND OF THE INVENTION

1. Field of the Invention

The invention relates to a display; in particular, to a soft-start control circuit applied to a DC-DC converting system suitable for power management of a display driver in a display.

2. Description of the Prior Art

Conventionally, the power supply of a gate driver (including a high-level output voltage VGH and a low-level output voltage VGL) in a liquid crystal display (LCD) is provided by a boost DC-DC converter and a buck-boost DC-DC converter respectively. The high-level output voltage VGH is a positive output voltage generated by the boost DC-DC converter, and the low-level output voltage VGL is a negative output voltage generated by the buck-boost DC-DC converter.

As shown in FIG. 1, a single-inductor dual-output (SIDO) DC-DC converting system 1 sharing the same inductor L1 can include a pulse-width modulation (PWM) signal generator 10, a soft-start control circuit 12, a time multiplexer 14, a current sensor 16, a SIDO DC-DC converter 18, a first error amplifier EA1 to a second error amplifier EA2, voltage-dividing resistors R1~R4, first inverters INV1<1:0>, a second inverter INV2 and a third inverter INV3. The SIDO DC-DC converter 18 can include a P-type transistor SP, an N-type transistor SN, a boost rectifier diode D1, a buck-boost rectifier diode D2, an output capacitor C1 corresponding to the high-level output voltage VGH, an output capacitor C2 corresponding to the low-level output voltage VGL and an inductor L1. The first inverters INV1<1:0> includes two first inverters INV1<1> and INV1<0>.

The first error amplifier EA1 receives a reference voltage VREFP and a feedback signal FBP respectively, and the feedback signal FBP is obtained by dividing the high-level output voltage VGH by the voltage-dividing resistors R1~R2. The second error amplifier EA2 receives a reference voltage VREFN and a feedback signal FBN respectively, and the feedback signal FBN is obtained by dividing a voltage difference between the reference voltage VREF and the low-level output voltage VGL by the voltage-dividing resistors R3~R4. The current sensor 16 is used to sense a current flowing through the N-type transistor SN and generate current sensing signals VCS<1:0>. The current sensing signals VCS<1:0> includes two current sensing signals VCS<1> and VCS<0>.

The pulse-width modulation signal generator 10 receives an over-current reference voltage CREF0, the first error amplification signal VEA1 outputted by the first error amplifier EA1, the second error amplification signal VEA2 outputted by the second error amplifier EA2, the current sensing signals VCS<1:0> output by the current sensor 16 and an over-current protection voltage VOCP respectively, and generates a first pulse-width modulation signal VPWM1 and a second pulse-width modulation signal VPWM2 to the soft-start control circuit 12 and the time multiplexer 14.

The soft-start control circuit 12 respectively receives a high-level output voltage enable signal EN_VGH, a low-level output voltage enable signal EN_VGL, the high-level output voltage VGH, the first feedback signal FBP, the second feedback signal FBN, the first reference voltage VREFP, the second reference voltage VREFN, the first pulse-width modulation signal VPWM1 and the second pulse-width modulation signal VPWM2, and accordingly generate a high-level output voltage ready signal VGHR, a low-level output voltage ready signal VGLR, a first error amplification ready signal VEA1R, a second error amplification ready signal VEA2R and a high-level output voltage control signal VGHC to the time multiplexer 14.

The time multiplexer 14 receives the high-level output voltage enable signal EN_VGH, the low-level output voltage enable signal EN_VGL, a clock signal CLK, a ½ clock signal CLKD2, the first pulse-width modulation signal VPWM1, the second pulse-width modulation signal VPWM2, the high-level output voltage ready signal VGHR, the low-level output voltage ready signal VGLR, the first error amplification ready signal VEA1R, the second error amplification ready signal VEA2R and the high-level output voltage control signal VGHC, and generates first reverse output signals PCTR<1:0> to the first inverters INV1<1:0>, generates a second reverse output signal NCTR to the second inverter INV2 and generates a third reverse output signal PCTRS to the third inverter INV3 respectively. The first reverse output signals PCTR<1:0> includes two first reverse output signals PCTR<1> and PCTR<0>.

When the first inverters INV1<1:0> receive the first reverse output signals PCTR<1:0>, the first inverters INV1<1:0> perform reverse process on the first reverse output signals PCTR <1:0> to generate first switch control signals VGP<1:0> to the P-type transistors SP<1:0> in the SIDO DC-DC converter 18 to control the operating timing of the P-type transistors SP<1:0>. The first switch control signals VGP<1:0> include two first switch control signals VGP<1> and VGP<0>. The P-type transistors SP<1:0> includes two P-type transistors SP<1> and SP<0>.

When the second inverter INV2 receives the second reverse output signal NCTR, the second inverter INV2 perform reverse process on the second reverse output signal NCTR to generate a second switch control signal VGN to the N-type transistor SN in the SIDO DC-DC converter 18 to control the operation timing of the N-type transistor SN.

When the third inverter INV3 receives the third reverse output signal PCTRS, the third inverter INV3 perform reverse process on the third reverse output signal PCTRS to generate a third switch control signal VGPS to the P-type transistor SP2 in the SIDO DC-DC converter 18 to control the operation timing of the P-type transistor SP2.

As shown in FIG. 2, in order to avoid the occurrence of subharmonic oscillation, the pulse-width modulation signal generator 10 can add sawtooth waves VSAW1 and VSAW2 to the current sensing signals VCS<0> and VCS<1> respectively through the adder + to perform slope compensation to form ramp signals VRAMP1 and VRAMP2, and the timing chart is shown in FIG. 3.

The positive input terminal + and the negative input terminal − of the comparator CMP1 receive the ramp signal VRAMP1 and the error amplification signal VEA1 respectively, and the comparator CMP1 generates a first pulse-width modulation signal VPWM1 to the OR gate OR1. The OR gate OR1 receives the over-current protection event signal OCPE and the first pulse-width modulation signal VPWM1 respectively, and outputs the first pulse-width modulation signal VPWM1, and the timing diagram thereof is shown in FIG. 3.

The positive input terminal + and the negative input terminal − of the comparator CMP2 receive the ramp signal VRAMP2 and the error amplification signal VEA2 respectively, and the comparator CMP2 generates a second pulse-width modulation signal VPWM2 to the OR gate OR2. The OR gate OR2 receives the over-current protection event signal OCPE and the second pulse-width modulation signal VPWM2 respectively, and outputs the second pulse-width modulation signal VPWM2, and the timing diagram thereof is shown in FIG. 3.

The positive input terminal + and the negative input terminal − of the comparator CMP3 receive the over-current protection voltage VOCP and the reference voltage VREF0 respectively, and the comparator CMP3 generates an over-current protection event signal OCPE to the OR gate OR1 or the OR gate OR2. When the over-current protection voltage VOCP is greater than the reference voltage VREF0, it represents that the inductor current flowing through the inductor L1 exceeds the rated value; therefore, the over-current protection event signal OCPE, the first pulse-width modulation signal VPWM1 and the second pulse-width modulation signal VPWM2 are all high-level.

It can be found from FIG. 1 that the SIDO DC-DC converting system 1 has the high-level output voltage enable signal (EN_VGH) and the low-level output voltage enable signal (EN_VGL), and the order of these two is not fixed, so there are four soft-start processes. However, the soft-start control circuit 12 used in the conventional SIDO DC-DC converting system 1 cannot avoid the inrush current during the four soft-start processes, resulting in poor power management of the display driver in the display. This phenomenon needs to be improved.

SUMMARY OF THE INVENTION

Therefore, the invention provides a soft-start control circuit applied to a DC-DC converting system to solve the above-mentioned problems of the prior arts.

A preferred embodiment of the invention is a soft-start control circuit applied to a DC-DC converting system to avoid the inrush current during the startup process of the DC-DC converting system. In this embodiment, the soft-start control circuit includes a first inverter to a third inverter, a first comparator to a third comparator, a first resistor to a fourth resistor, a first D-type flip-flop to a fourth D-type flip-flop and a NOR gate. The first inverter is used for receiving a first pulse-width modulation signal and outputting a reverse signal of the first pulse-width modulation signal. The second inverter is used for receiving a second pulse-width modulation signal and outputting a reverse signal of the second pulse-width modulation signal. The third inverter is used for receiving a high-level output voltage enable signal and outputting a reverse signal of the high-level output voltage enable signal. The first comparator is used for receiving a first feedback signal and a first reference voltage and outputting a first trigger signal. The second comparator is used for receiving a second feedback signal and a second reference voltage and outputting a second trigger signal. The first resistor and a second resistor are coupled in series between a high-level output voltage and a ground. The third resistor and a fourth resistor are coupled in series between an input voltage and the ground. The third comparator is coupled between the first resistor and the second resistor and between the third resistor and the fourth resistor and used for receiving a first divided voltage between the first resistor and the second resistor and a second divided voltage between the third resistor and the fourth resistor and outputting a third trigger signal. The first D-type flip-flop is coupled to the first inverter and used for receiving a reverse signal of the first pulse-width modulated signal, the input voltage and the high-level output voltage enable signal and outputting a first error amplification ready signal and a reverse signal of the first error amplification ready signal. The second D-type flip-flop is coupled to the second inverter and used for receiving a reverse signal of the second pulse-width modulated signal, the input voltage and the low-level output voltage enable signal and outputting a second error amplification ready signal and a reverse signal of the second error amplification ready signal. The third D-type flip-flop is coupled to the first comparator and used for receiving the first trigger signal, the input voltage and the high-level output voltage enable signal and outputting a high-level output voltage ready signal and a reverse signal of the high-level output voltage ready signal. The fourth D-type flip-flop is coupled to the second comparator for receiving the second trigger signal, the input voltage and the low-level output voltage enable signal and outputting a low-level output voltage ready signal and a reverse signal of the low-level output voltage ready signal. The NOR gate is coupled to the third inverter and the third comparator and used for receiving the reverse signal of the high-level output voltage enable signal and the third trigger signal and outputting a high-level output voltage control signal.

In an embodiment, the DC-DC converting system is a single-inductor dual-output (SIDO) DC-DC converting system for outputting a high-level output voltage and a low-level output voltage; the high-level output voltage is a positive voltage and the low-level output voltage is a negative voltage.

In an embodiment, the DC-DC converting system further includes a time multiplex circuit coupled to the soft-start control circuit and used for receiving the first error amplification ready signal, the second error amplification ready signal, the high-level output voltage ready signal, the low-level output voltage ready signal and the high-level output voltage control signal.

In an embodiment, the time multiplexing circuit further receives the first pulse-width modulation signal, the second pulse-width modulation signal, a clock signal, a clock related signal, the high-level output voltage enable signal and the low-level output voltage enable signal and outputs a first reverse output signal, a second reverse output signal and a third reverse output signal; the clock related signal is one-half of the clock signal.

In an embodiment, the DC-DC converting system further includes a SIDO DC-DC converter coupled to the time multiplex circuit through three inverters.

In an embodiment, the three inverters respectively convert the first reverse output signal, the second reverse output signal and the third reverse output signal outputted by the time multiplex circuit into a first switch control signal, a second switch control signal and a third switch control signal and then output the first switch control signal, the second switch control signal and the third switch control signal to the SIDO DC-DC converter.

In an embodiment, the SIDO DC-DC converter comprises an N-type transistor, a first P-type transistor, a second P-type transistor and an inductor; the first P-type transistor is coupled between the input voltage and the inductor, the second P-type transistor is coupled between the input voltage and the inductor, and the N-type transistor is coupled between the inductor and the ground; a gate of the N-type transistor is controlled by the first switch control signal, a gate of the first P-type transistor is controlled by the second switch control signal and a gate of the second P-type transistor is controlled by the third switch control signal.

In an embodiment, when the first feedback signal is greater than the first reference voltage, the first trigger signal outputted by the first comparator is high-level.

In an embodiment, when the second feedback signal is greater than the second reference voltage, the second trigger signal outputted by the second comparator is high-level.

In an embodiment, when the first divided voltage is greater than the second divided voltage, the third trigger signal outputted by the third comparator is high-level.

In an embodiment, the first error amplification ready signal outputted by the first D-type flip-flop is triggered by a back-porch of the first pulse-width modulation signal to change from low-level to high-level; when the high-level output voltage enable signal is low-level, the first error amplification ready signal is reset to low-level.

In an embodiment, the second error amplification preparation signal outputted by the second D-type flip-flop is triggered by a back-porch of the second pulse-width modulation signal to change from low-level to high-level; when the low-level output voltage enable signal is low-level, the second error amplification ready signal is reset to low-level.

In an embodiment, the high-level output voltage ready signal outputted by the third D-type flip-flop is triggered by a front-porch of the first trigger signal to change from low-level to high-level; when the high-level output voltage enable signal is at low-level, the high-level output voltage ready signal is reset to low-level.

In an embodiment, the low-level output voltage ready signal outputted by the fourth D-type flip-flop is triggered by a front-porch of the second trigger signal to change from low-level to high-level; when the low-level output voltage enable signal is at low-level, the low-level output voltage ready signal is reset to low-level.

In an embodiment, the first resistor and the third resistor have the same resistance value and the second resistor and the fourth resistor have the same resistance value; when the high-level output voltage is greater than the input voltage and the high-level output voltage enable signal is high-level, the high-level output voltage control signal outputted by the NOR gate is high-level.

In an embodiment, the high-level output voltage and a low-level output voltage are soft-started in a first soft-start process to a fourth soft-start process; when the high-level output voltage and the low-level output voltage are soft-started in overlapped time, the time multiplex circuit has a first time multiplexer mode to an eighth time multiplexer mode.

In an embodiment, during the first soft-start process, the high-level output voltage enable signal changes from low-level to high-level, so that the high-level output voltage starts to increase, and the time multiplex circuit is switched from the first time multiplexer mode to the second time multiplexer mode; when the high-level output voltage has not completed soft-start, the low-level output voltage also starts to decrease, and the time multiplex circuit is switched from the third time multiplexer mode to the seventh time multiplexer mode.

In an embodiment, during the second soft-start process, the low-level output voltage enable signal changes from low-level to high-level, so that the low-level output voltage starts to decrease, and the time multiplex circuit is switched from the first time multiplexer mode to the fifth time multiplexer mode; when the high-level output voltage has not completed soft-start, the high-level output voltage also starts to increase, and the time multiplex circuit is switched from the fifth time multiplexer mode to the sixth time multiplexer mode.

In an embodiment, during the third soft-start process, the high-level output voltage enable signal changes from low-level to high-level, so that the high-level output voltage starts to increase, and the time multiplex circuit is switched from the first time multiplexer mode to the second time multiplexer mode; after the high-level output voltage has completed soft-start, the low-level output voltage is started, and the time multiplex circuit operates in the fourth time multiplexer mode.

In an embodiment, during the fourth soft-start process, the low-level output voltage enable signal changes from low-level to high-level, so that the low-level output voltage starts to decrease, the time multiplex circuit is switched from the first time multiplexer mode to the fifth time multiplexer mode; after the low-level output voltage has completed soft-start, the high-level output voltage is started, and the time multiplex circuit operates in the fifth time multiplexer mode.

Compared to the prior art, the soft-start control circuit applied to the DC-DC converting system of the invention can be suitable for the power management of a display driver in a display and used for avoiding the inrush current of the DC-DC converter during the startup process. Since the DC-DC converter has two enable signals: a high-level output voltage enable signal (EN_VGH) and a low-level output voltage enable signal (EN_VGL), and the order of these two enable signals is not fixed, there are four kinds of soft-start process. The soft-start control circuit applied to the DC-DC converting system of the invention can realize no inrush current generated during the four soft-start processes of the DC-DC converter.

The advantage and spirit of the invention may be understood by the following detailed descriptions together with the appended drawings.

BRIEF DESCRIPTION OF THE APPENDED DRAWINGS

FIG. 1 illustrates a schematic diagram showing a conventional SIDO DC-DC converting system.

FIG. 2 illustrates an embodiment of the PWM signal generator of FIG. 1.

FIG. 3 illustrates a timing diagram of generating a PWM signal according to a ramp signal and an error amplification signal.

FIG. 4 illustrates a schematic diagram of a soft-start control circuit applied to a DC-DC converting system in an embodiment of the invention.

FIG. 5 illustrates a timing diagram of the signals of the soft-start control circuit during the startup of the high-level output voltage.

FIG. 6 illustrates a timing diagram of the signals of the soft-start control circuit during the startup of the low-level output voltage.

FIG. 7A~FIG. 9B illustrate six operational phases and a power-down phase of the SIDO DC-DC converter during the soft-start process respectively.

FIG. 10A and FIG. 10B illustrate timing diagrams of the phases corresponding to different low-level output voltage states respectively.

FIG. 11 illustrates a timing diagram of the soft-start process of the low-level output voltage.

FIG. 12A, FIG. 12B, FIG. 12C, and FIG. 12D illustrate timing diagrams of the phases corresponding to different high-level output voltage states respectively.

FIG. 13 illustrates a timing diagram of the soft-start process of the high-level output voltage.

FIG. 14A~FIG. 16C illustrate timing diagrams of being operated in a first time multiplexer mode to an eighth time multiplexer mode respectively.

FIG. 17~FIG. 20 illustrate timing diagrams of the four soft-start processes of the high-level output voltage and the low-level output voltage respectively.

DETAILED DESCRIPTION OF THE INVENTION

A preferred embodiment of the invention is a soft-start control circuit applied to a DC-DC converting system and suitable for power management of a display driver in a display device for avoiding the inrush current generated during different soft-start processes of the DC-DC converter of the DC-DC converting system.

In fact, the DC-DC converting system can be a single-inductor dual-output (SIDO) DC-DC converting system for outputting a high-level output voltage (VGH) and a low-level output voltage (VGL), wherein the high-level output voltage (VGH) is a positive voltage and the low-level output voltage (VGL) is a negative voltage, but not limited to this.

Since the DC-DC converting system uses two enable signals: a high-level output voltage enable signal (EN_VGH) and a low-level output voltage enable signal (EN_VGL), and the order of these two enable signals is not fixed, so that there will be four soft-start processes:

(1) The high-level output voltage VGH is firstly started, but when the high-level output voltage VGH has not completed soft-start, the low-level output voltage VGL is also started.

(2) The low-level output voltage VGL is firstly started, and when the low-level output voltage VGL has not completed soft-start, the high-level output voltage VGH is also started.

(3) The high-level output voltage VGH is firstly started, and after the high-level output voltage VGH has completed soft-start, the low-level output voltage VGL is then started.

(4) The low-level output voltage VGL is firstly started, and after the low-level output voltage VGL has completed soft-start, the high-level output voltage VGH is started.

Through the soft-start control circuit of the invention, there will be no inrush current generated in the above four soft-start processes of the DC-DC converting system, thereby overcoming the problems encountered in the prior art.

Please refer to FIG. 4. FIG. 4 illustrates a schematic diagram of the soft-start control circuit applied to the DC-DC converting system in this embodiment.

As shown in FIG. 4, the soft-start control circuit 12 applied to the DC-DC converting system can include comparators CMP4~CMP6, D-type flip-flops DFF1~DFF4, inverters INV4~INV6, resistors R5~R8 and a NOR gate NOR1. The inverter INV4 is coupled to the D-type flip-flop DFF1; the inverter INV5 is coupled to the D-type flip-flop DFF2; the inverter INV6 is coupled to the NOR gate NOR1; the comparator CMP4 is coupled to the D-type flip-flop DFF3; the comparator CMP5 is coupled to the D-type flip-flop DFF4; the comparator CMP6 is coupled to the NOR gate NOR1; the resistors R5 and R6 are coupled in series between the high-level output voltage VGH and the ground; the resistors R7 and R8 are coupled in series between the input voltage VIN and the ground; the positive input terminal + of the comparator CMP6 is coupled between the resistors R5 and R6 and the negative input terminal − of the comparator CMP6 is coupled between the resistors R7 and R8.

The comparator CMP4 receives the first feedback signal FBP and the first reference voltage VREFP and generates a first trigger signal TR1 to the D-type flip-flop DFF3. The D-type flip-flop DFF3 receives the first trigger signal TR1, the high-level output voltage enable signal EN_VGH and the input voltage VIN and generates the high-level output voltage ready signal VGHR and a reverse signal $\overline{\text{VGHR}}$ of the high-level output voltage ready signal VGHR respectively. The comparator CMP5 receives the second feedback signal FBN and the second reference voltage VREFN and generates a second trigger signal TR2 to the D-type flip-flop DFF4. The D-type flip-flop DFF4 receives the second trigger signal TR2, the low-level output voltage enable signal EN_VGL and the input voltage VIN and generates the low-level output voltage ready signal VGLR and a reverse signal $\overline{\text{VGLR}}$ of the low-level output voltage ready signal VGLR respectively.

The inverter INV4 receives the first PWM signal VPWM1 and generates a reverse signal $\overline{\text{VPWM1}}$ of the first PWM signal VPWM1 to the D-type flip-flop DFF1. The D-type flip-flop DFF1 receives the reverse signal $\overline{\text{VPWM1}}$ of the first PWM signal VPWM1, the high-level output voltage enable signal EN_VGH and the input voltage VIN, and generates the error amplification preparation signal VEA1R and a reverse signal $\overline{\text{VEA1R}}$ of the error amplification preparation signal VEA1R respectively. The inverter INV5 receives the second PWM signal VPWM2 and generates a reverse signal $\overline{\text{VPWM2}}$ of the second PWM signal VPWM2 to the D-type flip-flop DFF2. The D-type flip-flop DFF2 receives the reverse signal $\overline{\text{VPWM2}}$ of the second PWM signal VPWM2, the low-level output voltage enable signal EN_VGL and the input voltage VIN, and generates the error amplification ready signal VEA2R and a reverse signal $\overline{\text{VEA2R}}$ of the error amplification ready signal VEA2R respectively.

The positive input terminal + of the comparator CMP6 receives a divided voltage VGHF of the high-level output voltage VGH from a node between the resistors R5 and R6 and the negative input terminal − of the comparator CMP6 receives a divided voltage of the input voltage VIN from a node between the resistors R7 and R8, and accordingly generates the third trigger signal TR3 to the NOR gate NOR1. The inverter INV6 receives the high-level output voltage enable signal EN_VGH and accordingly generates the reverse signal $\overline{\text{EN\_VGH}}$ of the high-level output voltage enable signal EN_VGH to the NOR gate NOR1. The NOR gate NOR1 receives the third trigger signal TR3 and the reverse signal $\overline{\text{EN\_VGH}}$ of the high-level output voltage enable signal EN_VGH respectively, and accordingly generates the high-level output voltage control signal VGHC.

It should be noted that when the first feedback signal FBP is greater than the first reference voltage VREFP, the first trigger signal TR1 generated by the comparator CMP4 is high-level; when the second feedback signal FBN is greater than the second reference voltage VREFN, the second trigger signal TR2 generated by the comparator CMP5 is high-level; when the divided voltage VGHF of the high-level output voltage VGH is greater than the divided voltage VINF of the input voltage VIN, the third trigger signal TR3 generated by the comparator CMP6 is high-level.

The error amplification ready signal VEA1R generated by the D-type flip-flop DFF1 is triggered by the back-porch of the first PWM signal VPWM1 to change from low-level to high-level. When the high-level output voltage enable signal EN_VGH is low, the error amplification ready signal VEA1R generated by the D type flip-flop DFF1 is reset to low-level.

The error amplification preparation signal VEA2R generated by the D-type flip-flop DFF2 is triggered by the back-porch of the second PWM signal VPWM2 to change from low-level to high-level. When the low-level output voltage enable signal EN_VGL is low, the error amplification ready signal VEA2R generated by the D type flip-flop DFF2 is reset to low-level.

The high-level output voltage ready signal VGHR generated by the D-type flip-flop DFF3 is triggered by the front-porch of the first trigger signal TR1 (that is, the first feedback signal FBP is greater than the first reference voltage VREFP) and changed from low-level to high-level. When the high-level output voltage enable signal EN_VGH is low, the high-level output voltage ready signal VGHR generated by the D type flip-flop DFF3 is reset to low-level.

The low-level output voltage ready signal VGLR generated by the D-type flip-flop DFF4 is triggered by the front-porch of the second trigger signal TR2 (that is, the second feedback signal FBN is greater than the second reference voltage VREFN) and changed from low-level to high-level. When the low-level output voltage enable signal EN_VGL is low, the low-level output voltage ready signal VGLR generated by the D type flip-flop DFF4 is reset to the low-level.

The resistance values of the resistors R5 and R7 are equal and the resistance values of the resistors R6 and R8 are equal. When the high-level output voltage VGH is greater than the input voltage VIN and the high-level output voltage enable signal EN_VGH is high-level, the high-level output voltage control signal VGHC outputted by the NOR gate NOR1 is high-level.

Next, please refer to FIG. 5. FIG. 5 illustrates a timing diagram of the signals of the soft-start control circuit 12 during the startup process of the high-level output voltage VGH.

As shown in FIG. 5, after the time T1, that is, after the high-level output voltage enable signal EN_VGH changes from low-level to high-level, all signals in FIG. 5 will start to operate. When the high-level output voltage enable signal EN_VGH is low, circuits related to the high-level output voltage VGH will operate in the power down (PD) mode.

The first PWM signal VPWM1 is generated by the PWM signal generator 10. When the first error amplification signal VEA1 outputted by the first error amplifier EA1 is higher than the first ramp signal VRAMP1, the first PWM signal VPWM1 will start to be triggered. When the first error amplification signal VEA1 is changed from low-level to high-level, the pulse width of the first PWM signal VPWM1 will be also increased, so that the peak value of the inductor current will be also increased to avoid the inrush current.

The error amplification ready signal VEA1R is generated by the D-type flip-flop DFF1. Once the first PWM signal VPWM1 starts to be triggered, the first falling edge (Falling edge) causes the error amplification preparation signal VEA1R generated by the D-type flip-flop DFF1 to change from a low-level to a high-level, representing an error. The amplification signal VEA1 is higher than the first ramp signal VRAMP1 and is sufficient to generate the first pulse width modulation signal VPWM1.

The high-level output voltage ready signal VGHR is generated by the comparator CMP4 and the D-type flip-flop DFF3. When the first feedback signal FBP of the high-level output voltage VGH rises to the first reference voltage VREFP, the first trigger signal TR1 generated by the comparator CMP4 will change from low-level to high-level, so that the high-level output voltage ready signal VGHR generated by the D-type flip-flop DFF3 will change from low-level to high-level, indicating that the high-level output voltage VGH has reached a set value (the first reference voltage VREFP/the resistance of the resistor R2*(the resistance of the resistor R1+the resistance of the resistor R2)), that is, the high-level output voltage VGH has completed the soft-start process.

The high-level output voltage control signal VGHC is generated by the comparator CMP6 and the NOR gate NOR1. Since the resistance values of the resistors R5 and R7 are equal and the resistance values of the resistors R6 and F8 are equal, when the divided voltage VGHF of the high-level output voltage VGH is equal to the divided voltage VINF of the input voltage VIN, it represents that the high-level output voltage VGH and the input voltage VIN are equal. At this time, the third trigger signal TR3 generated by the comparator CMP6 is changed from low-level to high-level, so that the high-level output voltage control signal VGHC generated by the NOR gate NOR1 will change from high-level to low-level at the time T3, and the period that the high-level output voltage control signal VGHC is high-level (e.g., the time T1 to the time T3) represents the time it takes for the high-level output voltage VGH to rise from 0V to the input voltage VIN after the high-level output voltage VGH is started.

Next, please refer to FIG. 6. FIG. 6 illustrates a timing diagram of the signals of the soft-start control circuit 12 during the startup process of the low-level output voltage VGL.

As shown in FIG. 6, after the time T1, that is, after the low-level output voltage enable signal EN_VGL changes from low-level to high-level, all signals in FIG. 6 will start to operate. When the low-level output voltage enable signal EN_VGL is low-level, circuits related to the low-level output voltage VGL will operate in the power down (PD) mode.

The second PWM signal VPWM2 is generated by the PWM signal generator 10. When the second error amplification signal VEA2 outputted by the second error amplifier EA2 is higher than the second ramp signal VRAMP2, the second PWM signal VPWM2 will start to be triggered when the second error amplification signal VEA2 is changed from low-level to high-level. The pulse width of the second PWM signal VPWM2 will be increased, so that the peak value of the inductor current will be also increased to avoid the inrush current.

The error amplification ready signal VEA2R is generated by the D-type flip-flop DFF2. Once the second PWM signal VPWM2 starts to be triggered, the first falling edge causes the error amplification ready signal VEA2R generated by the D-type flip-flop DFF2 to change from low-level to high-level, representing that the error amplification signal VEA2 is higher than the second ramp signal VRAMP2 and is sufficient to generate the second PWM signal VPWM2.

The low-level output voltage ready signal VGLR is generated by the comparator CMP5 and the D-type flip-flop DFF4. When the second feedback signal FBN of the low-level output voltage VGL rises to the second reference voltage VREFN, the second trigger signal TR2 generated by the comparator CMP5 will change from low-level to high-level, so that the low-level output voltage ready signal VGLR generated by the D-type flip-flop DFF4 will change from low-level to high-level, indicating that the low-level output voltage VGL has reached a set value (the reference voltage VREF-(the reference voltage VREF−the second reference voltage VREFN)/the resistance of the resistor R3*(the resistance of the resistor R3+the resistance of the resistor R4)); that is, the low-level output voltage VGL has completed the soft-start process.

Next, please refer to FIG. 7A to FIG. 9B. FIG. 7A~FIG. 9B illustrate six operational phases and a power-down phase of the SIDO DC-DC converter during the soft-start process respectively.

As shown in FIGS. 7A and 7B, the SIDO DC-DC converter 18 operates in the A1 phase and the A2 phase respectively. The A1 phase and the A2 phase both belong to the phase of the inductor storing energy, the difference is that the P-type transistor SP<1> in the A1 phase is in the OFF-state, and the P-type transistor SP<1> and SP<0> in the A2 phase are both in the ON-state. Since the area ratio of the P-type transistor SP<1> to the SP<0> is 64:7, the on-resistance of the P-type transistor SP<1> in the A1 phase is large, so that the inductor current is small.

As shown in FIG. 8A to FIG. 8C, the SIDO output DC-DC converter 18 operates in the B0 phase to the B2 phase respectively. All of them belong to the phase of charging the output capacitor C1 of the high-level output voltage VGH, and the difference is that the area ratio of the P type transistor SP<1>, SP<0> and SP2 is 64:7:1, so that the on-resistances from large to small are sequentially P-type transistors SP<1>, SP<0> and SP2, and the capacitance charging currents of the respective phases are sequentially from the B2 phase, the B1 phase and the B0 phase.

As shown in FIG. 9A, the SIDO output DC-DC converter 18 operates in the C phase, which belongs to the phase of discharging the output capacitor C2 of the low-level output voltage VGL.

As shown in FIG. 9B, the SIDO output DC-DC converter 18 operates in the power-down phase, and all transistors are in OFF-state.

In an embodiment, in a clock cycle, the A2 phase, the C phase and the power-down phase PD can form two states of the low-level output voltage VGL: the BB-PD state and the BB state respectively, as shown in Table 1:

TABLE 1

| VGL state | Phase | Corresponding logic signal |
| --- | --- | --- |
| BB-PD | Power-down phase PD | Error amplification ready signal VEA2R is low-level |
| BB | A2 phase + C phase | Error amplification ready signal VEA2R is high-level |

As shown in FIG. 10A, the state BB-PD of the low-level output voltage VGL corresponds to the power-down phase PD. At this time, the control loop of the low-level output voltage VGL fails to generate the second PWM signal VPWM2, and the error amplification ready signal VEA2R is low-level.

As shown in FIG. 10B, the state BB of the low-level output voltage VGL corresponds to the A2 phase and the C phase and belongs to the BUCK-BOOST operation. The current is controlled by the over-current protection function, and the error amplification ready signal VEA2R is high-level.

Please refer to FIG. 11. FIG. 11 illustrates a timing diagram of a soft-start process of the low-level output voltage VGL. As shown in FIG. 11, when the error amplification ready signal VEA2R changes from low-level to high-level, at the time T1, the low-level output voltage VGL will start to decrease from the original 0V, and the state of the low-level output voltage VGL will be changed from the state BB-PD to the state BB.

In another embodiment, the A1 phase, the A2 phase, the B0 phase, the B1 phase, the B2 phase and the power-off phase PD can constitute four states of the high-level output voltages VGH in one clock cycle: the BST-PD state, the BST-SS0 state, the BST-SS1 state and the BST state, as shown in Table 2:

TABLE 2

| VGH state | Phase | Corresponding logic signal |
| --- | --- | --- |
| BST-PD | Power-down phase PD | High-level output voltage enable signal EN_VGH is low-level |
| BST-SS0 | B0 phase | High-level output voltage enable signal EN_VGH is high-level + Error amplification ready signal VEA1R is low-level |
| BST-SS1 | A1 phase + B1 phase | Error amplification ready signal VEA1R is high-level + High-level output voltage control signal VGHC is high-level |
| BST | A2 phase + B2 phase | Error amplification ready signal VEA1R is high-level + High-level output voltage control signal VGHC is low-level |

As shown in FIG. 12A, the state BST-PD of the high-level output voltage VGH is composed of the power-down phase PD, and the high-level output voltage enable signal EN_VGH is low-level.

As shown in FIG. 12B, the state BST-SS0 of the high-level output voltage VGH is composed of the phase B0. When the high-level output voltage VGH control loop is started (that is, the high-level output voltage enable signal EN_VGH is high-level), the error amplification voltage VEA1 does not exceed the ramp signal VRAMP1, so that the error amplification preparation signal VEA1R is low-level and fails to generate the pulse width modulation signal VPWM1, and it is charged through the P-type transistor SP2 having large resistance to avoid the generation of the inrush current.

As shown in FIG. 12C, the state BST-SS1 of the high-level output voltage VGH is composed of the phase A1 and the phase B1, and belongs to a boost operation. At this time, the error amplification voltage VEA1 has exceeded the ramp signal VRAMP1 to generate the PWM signal VPWM1, since the high-level output voltage VGH is still lower than the input voltage VIN, there is only the P-type transistor SP<0> turned on under the phase A1 and the phase B1 to perform boosting through the P-type transistor SP<0> having large resistance to avoid the generation of the inrush current.

As shown in FIG. 12D, the state BST of the high-level output voltage VGH is composed of the phase A2 and the phase B2, and belongs to a boost operation. When the high-level output voltage VGH rises above the input voltage VIN, that is, the error amplification ready signal VEA1R is high-level and the high-level output voltage control signal VGHC is low-level, all transistors are turned on for boosting, and the current is controlled by the over-current protection function.

Please refer to FIG. 13. FIG. 13 illustrates a timing diagram of the soft-start process of the high-level output voltage. As shown in FIG. 13, when the high-level output voltage enable signal EN_VGH changes from low-level to high-level, that is, the time T1, the state of the high-level output voltage VGH changes from the state BST-PD to the state BST-SS0. When the error amplification ready signal VEA1R changes from low-level to high-level, that is, at time T2, the state of the high-level output voltage VGH changes from the state BST-SS0 to the state BST-SS1. When the high-level output voltage control signal VGHC changes from high-level to low-level, that is, the time T3, the high-level output voltage VGH rises to be equal to the input voltage VIN, and the state of the high-level output voltage VGH changes from the state BST-SS1 to the state BST.

Since the DC-DC converting system uses two enable signals: a high-level output voltage enable signal (EN_VGH) and a low-level output voltage enable signal (EN_VGL), and the order of these two enable signals is not fixed, there will be four soft-start processes:

(1) the first soft-start process: the high-level output voltage VGH is firstly started, but when the high-level output voltage VGH has not completed the soft-start, the low-level output voltage VGL is also started.

(2) the second soft-start process: the low-level output voltage VGL is firstly started, and when the low-level output voltage VGL has not completed the soft-start, the high-level output voltage VGH is also started.

(3) the third soft-start process: the high-level output voltage VGH is firstly started, and after the high-level output voltage VGH has completed the soft-start, the low-level output voltage VGL is started.

(4) the fourth soft-start process: the low-level output voltage VGL is firstly started, and after the low-level output voltage VGL has completed the soft-start, the high-level output voltage VGH is started.

When the soft-start of the high-level output voltage VGH and the low-level output voltage VGL overlap each other in time, it is necessary to sequentially allocate two states in two periods (2T) using a time multiplexing technique to let each period (T) have the same phase or different phases. Therefore, there will be eight time multiplexer modes in this process, as shown in Table 3:

Please refer to FIG. 14A. In the first time multiplexer mode PD, the state of the low-level output voltage VGL is the state BB-PD and the state of the high-level output voltage state VGH is the state BST-PD, and the first period (from the time 0 to the time T) and the second period (from the time T to the time 2T) are both the phase PD.

Please refer to FIG. 14B. In the second time multiplexer mode SS0-SS0, the state of the low-level output voltage VGL is the state BB-PD and the state of the high-level output voltage state VGH is the state BST-SS0, and the first period (from the time 0 to the time T) and the second period (from the time T to the time 2T) are both the phase B0.

Please refer to FIG. 14C. In the third time multiplexer mode SS1-SS1, the state of the low-level output voltage VGL is the state BB-PD and the state of the high-level output voltage state VGH is the state BST-SS1, and the first period (from the time 0 to the time T) and the second period (from the time T to the time 2T) are both the phase A1+the phase B1.

Please refer to FIG. 15A. In the fourth time multiplexer mode BST-BST, the state of the low-level output voltage VGL is the state BB-PD and the state of the high-level output voltage VGH is the state BST, and the first period (from the time 0 to the time T) and the second period (from the time T to the time 2T) are both the phase A2+the phase B2.

Please refer to FIG. 15B. In the fifth time multiplexer mode BB-BB, the state of the low-level output voltage VGL is the state BB and the state of the high-level output voltage VGH is the state BST-PD, and the first period (from the time 0 to the time T) and the second period (from the time T to the time 2T) are both the phase A2+the phase C.

Please refer to FIG. 16A. In the sixth time multiplexer mode TMUX0, the state of the low-level output voltage VGL is the state BB and the state of the high-level output voltage state VGH is the state BST-SS0, and the first period (from the time 0 to the time T) is the phase A2+the phase C and the second period (from the time T to the time 2T) is the phase B0.

Please refer to FIG. 16B. In the seventh time multiplexer mode TMUX1, the state of the low-level output voltage VGL is the state BB and the state of the high-level output voltage state VGH is the state BST-SS1, and the first period (from the time 0 to the time T) is the phase A2+the phase C and the second period (from the time T to the time 2T) is the phase A2+the phase B2.

Please refer to FIG. 16C. In the eighth time multiplexer mode TMUX, the state of the low-level output voltage VGL is the state BB and the state of the high-level output voltage state VGH is the state BST, and the first period (from the

TABLE 3

| Time multiplexer mode | State of low-level output voltage | State of high-level output voltage | Phase First period (Time 0~time T) | Phase Second period (Time T~Time 2T) | Corresponding logic signal |
|---|---|---|---|---|---|
| PD | BB-PD | BST-PD | PD | PD | EN_VGH*VEA2R |
| SS0-SS0 | | BST-SS0 | B0 | B0 | EN_VGH*VEA1R*VEA2R |
| SS1-SS1 | | BST-SS1 | A1 + B1 | A1 + B1 | VEA1R*VEA2R*VGHC |
| BST-BST | | BST | A2 + B2 | A2 + B2 | VEA1R*VEA2R*VGHC |
| BB-BB | BB | BST-PD | A2 + C | A2 + C | EN_VGH*VEA2R |
| TMUX0 | | BST-SS0 | | B0 | EN_VGH*VEA1R*VEA2R |
| TMUX1 | | BST-SS1 | | A1 + B1 | VEA1R*VEA2R*VGHC |
| TMUX | | BST | | A2 + B2 | VEA1R*VEA2R*VGHC | time 0 to the time T) is the phase A2+the phase C and the second period (from the time T to the time 2T) is the phase A1+the phase B1.

Please refer to FIG. 17. During the first soft-start process, the high-level output voltage enable signal EN_VGH changes from low-level to high-level before the time T1, so that the high-level output voltage VGH starts to rise. When the high-level output voltage VGH has not completed the soft-start, that is, the low-level output voltage VGL starts to fall at the time T3 before the time T4. For the correspondence between the time multiplexer mode and the logic signal, please refer to Table 4.

TABLE 4

| Time multiplexer mode | Corresponding logic signal |
|---|---|
| PD | EN_VGH*VEA2R |
| SS0-SS0 | EN_VGH*VEA1R*VEA2R |

TABLE 4-continued

| Time multiplexer mode | Corresponding logic signal |
| --- | --- |
| SS1-SS1 | VEA1R*$\overline{\text{VEA2R}}$*VGHC |
| BST-BST | VEA1R*$\overline{\text{VEA2R}}$*$\overline{\text{VGHC}}$ |
| BB-BB | $\overline{\text{EN\_VGH}}$*VEA2R |
| TMUX0 | EN_VGH*VEA1R*VEA2R |
| TMUX1 | VEA1R*VEA2R*VGHC |
| TMUX | VEA1R*VEA2R*VGHC |

Please refer to FIG. 18. During the second soft-start process, the low-level output voltage enable signal EN_VGL changes from low-level to high-level before the time T1, so that the low-level output voltage VGL starts at the time T1 and starts to fall. When the low-level output voltage VGL has not completed the soft-start, that is, the high-level output voltage VGH starts to rise at the time T2 before the time T5. For the correspondence between the time multiplexer mode and the logic signal, please refer to Table 5.

TABLE 5

| Time multiplexer mode | Corresponding logic signal |
| --- | --- |
| PD | $\overline{\text{EN\_VGH}}$*$\overline{\text{VEA2R}}$ |
| SS0-SS0 | EN_VGH*$\overline{\text{VEA1R}}$*$\overline{\text{VEA2R}}$ |
| SS1-SS1 | VEA1R*$\overline{\text{VEA2R}}$*VGHC |
| BST-BST | VEA1R*$\overline{\text{VEA2R}}$*$\overline{\text{VGHC}}$ |
| BB-BB | $\overline{\text{EN\_VGH}}$*VEA2R |
| TMUX0 | EN_VGH*$\overline{\text{VEA1R}}$*VEA2R |
| TMUX1 | VEA1R*VEA2R*VGHC |
| TMUX | VEA1R*VEA2R*$\overline{\text{VGHC}}$ |

Please refer to FIG. 19. During the third soft-start process, the high-level output voltage enable signal EN_VGH changes from low-level to high-level before the time T1, so that the high-level output voltage VGH starts to rise. After the high-level output voltage VGH completes the soft-start, that is, the low-level output voltage VGL is started after the time T3. For the correspondence between the time multiplexer mode and the logic signal, please refer to Table 6.

TABLE 6

| Time multiplexer mode | Corresponding logic signal |
| --- | --- |
| PD | $\overline{\text{EN\_VGH}}$*$\overline{\text{VEA2R}}$ |
| SS0-SS0 | EN_VGH*$\overline{\text{VEA1R}}$*$\overline{\text{VEA2R}}$ |
| SS1-SS1 | VEA1R*$\overline{\text{VEA2R}}$*VGHC |
| BST-BST | VEA1R*$\overline{\text{VEA2R}}$*$\overline{\text{VGHC}}$ |
| BB-BB | $\overline{\text{EN\_VGH}}$*VEA2R |
| TMUX0 | EN_VGH*$\overline{\text{VEA1R}}$*VEA2R |
| TMUX1 | VEA1R*VEA2R*VGHC |
| TMUX | VEA1R*VEA2R*$\overline{\text{VGHC}}$ |

Please refer to FIG. 20. During the fourth soft-start process, the low-level output voltage enable signal EN_VGL changes from low-level to high-level before the time T1, so that the low-level output voltage VGL is started before the time T1. After the low-level output voltage VGL has completed the soft-start, that is, the high-level output voltage VGH is started after the time T2. For the correspondence between the time multiplexer mode and the logic signal, please refer to Table 7.

TABLE 7

| Time multiplexer mode | Corresponding logic signal |
| --- | --- |
| PD | $\overline{\text{EN\_VGH}}$*$\overline{\text{VEA2R}}$ |
| SS0-SS0 | EN_VGH*$\overline{\text{VEA1R}}$*$\overline{\text{VEA2R}}$ |
| SS1-SS1 | VEA1R*$\overline{\text{VEA2R}}$*VGHC |

TABLE 7-continued

| Time multiplexer mode | Corresponding logic signal |
| --- | --- |
| BST-BST | VEA1R*$\overline{\text{VEA2R}}$*$\overline{\text{VGHC}}$ |
| BB-BB | $\overline{\text{EN\_VGH}}$*VEA2R |
| TMUX0 | EN_VGH*$\overline{\text{VEA1R}}$*VEA2R |
| TMUX1 | VEA1R*VEA2R*VGHC |
| TMUX | VEA1R*VEA2R*$\overline{\text{VGHC}}$ |

Compared to the prior art, the soft-start control circuit applied to the DC-DC converting system of the invention can be suitable for the power management of a display driver in a display and used for avoiding the inrush current of the DC-DC converter during the startup process. Since the DC-DC converter has two enable signals: a high-level output voltage enable signal (EN_VGH) and a low-level output voltage enable signal (EN_VGL), and the order of these two enable signals is not fixed, there are four kinds of soft-start process. The soft-start control circuit applied to the DC-DC converting system of the invention can realize no inrush current generated during the four soft-start processes of the DC-DC converter.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A soft-start control circuit applied to a DC-DC converting system, the soft-start control circuit comprising:
    a first inverter, for receiving a first pulse-width modulation signal and outputting a reverse signal of the first pulse-width modulation signal;
    a second inverter, for receiving a second pulse-width modulation signal and outputting a reverse signal of the second pulse-width modulation signal;
    a third inverter, for receiving a high-level output voltage enable signal and outputting a reverse signal of the high-level output voltage enable signal;
    a first comparator, for receiving a first feedback signal and a first reference voltage and outputting a first trigger signal;
    a second comparator, for receiving a second feedback signal and a second reference voltage and outputting a second trigger signal;
    a first resistor and a second resistor, coupled in series between a high-level output voltage and a ground;
    a third resistor and a fourth resistor, coupled in series between an input voltage and the ground;
    a third comparator, coupled between the first resistor and the second resistor and between the third resistor and the fourth resistor, for receiving a first divided voltage between the first resistor and the second resistor and a second divided voltage between the third resistor and the fourth resistor and outputting a third trigger signal;
    a first D-type flip-flop, coupled to the first inverter, for receiving a reverse signal of the first pulse-width modulated signal, the input voltage and the high-level output voltage enable signal and outputting a first error amplification ready signal and a reverse signal of the first error amplification ready signal;
    a second D-type flip-flop, coupled to the second inverter, for receiving a reverse signal of the second pulse-width modulated signal, the input voltage and the low-level output voltage enable signal and outputting a second error amplification ready signal and a reverse signal of the second error amplification ready signal;

a third D-type flip-flop, coupled to the first comparator, for receiving the first trigger signal, the input voltage and the high-level output voltage enable signal and outputting a high-level output voltage ready signal and a reverse signal of the high-level output voltage ready signal;

a fourth D-type flip-flop, coupled to the second comparator, for receiving the second trigger signal, the input voltage and the low-level output voltage enable signal and outputting a low-level output voltage ready signal and a reverse signal of the low-level output voltage ready signal; and a NOR gate, coupled to the third inverter and the third comparator, for receiving the reverse signal of the high-level output voltage enable signal and the third trigger signal and outputting a high-level output voltage control signal.

2. The soft-start control circuit of claim 1, wherein the DC-DC converting system is a single-inductor dual-output (SIDO) DC-DC converting system for outputting a high-level output voltage and a low-level output voltage; the high-level output voltage is a positive voltage and the low-level output voltage is a negative voltage.

3. The soft-start control circuit of claim 1, wherein the DC-DC converting system further comprises:

a time multiplex circuit, coupled to the soft-start control circuit, for receiving the first error amplification ready signal, the second error amplification ready signal, the high-level output voltage ready signal, the low-level output voltage ready signal and the high-level output voltage control signal.

4. The soft-start control circuit of claim 3, wherein the time multiplexing circuit further receives the first pulse-width modulation signal, the second pulse-width modulation signal, a clock signal, a clock related signal, the high-level output voltage enable signal and the low-level output voltage enable signal and outputs a first reverse output signal, a second reverse output signal and a third reverse output signal; the clock related signal is one-half of the clock signal.

5. The soft-start control circuit of claim 4, wherein the DC-DC converting system further comprises:

a SIDO DC-DC converter, coupled to the time multiplex circuit through three inverters.

6. The soft-start control circuit of claim 5, wherein the three inverters respectively convert the first reverse output signal, the second reverse output signal and the third reverse output signal outputted by the time multiplex circuit into a first switch control signal, a second switch control signal and a third switch control signal and then output the first switch control signal, the second switch control signal and the third switch control signal to the SIDO DC-DC converter.

7. The soft-start control circuit of claim 6, wherein the SIDO DC-DC converter comprises an N-type transistor, a first P-type transistor, a second P-type transistor and an inductor; the first P-type transistor is coupled between the input voltage and the inductor, the second P-type transistor is coupled between the input voltage and the inductor, and the N-type transistor is coupled between the inductor and the ground; a gate of the N-type transistor is controlled by the first switch control signal, a gate of the first P-type transistor is controlled by the second switch control signal and a gate of the second P-type transistor is controlled by the third switch control signal.

8. The soft-start control circuit of claim 1, wherein when the first feedback signal is greater than the first reference voltage, the first trigger signal outputted by the first comparator is high-level.

9. The soft-start control circuit of claim 1, wherein when the second feedback signal is greater than the second reference voltage, the second trigger signal outputted by the second comparator is high-level.

10. The soft-start control circuit of claim 1, wherein when the first divided voltage is greater than the second divided voltage, the third trigger signal outputted by the third comparator is high-level.

11. The soft-start control circuit of claim 1, wherein the first error amplification ready signal outputted by the first D-type flip-flop is triggered by a back-porch of the first pulse-width modulation signal to change from low-level to high-level; when the high-level output voltage enable signal is low-level, the first error amplification ready signal is reset to low-level.

12. The soft-start control circuit of claim 1, wherein the second error amplification preparation signal outputted by the second D-type flip-flop is triggered by a back-porch of the second pulse-width modulation signal to change from low-level to high-level; when the low-level output voltage enable signal is low-level, the second error amplification ready signal is reset to low-level.

13. The soft-start control circuit of claim 1, wherein the high-level output voltage ready signal outputted by the third D-type flip-flop is triggered by a front-porch of the first trigger signal to change from low-level to high-level; when the high-level output voltage enable signal is at low-level, the high-level output voltage ready signal is reset to low-level.

14. The soft-start control circuit of claim 1, wherein the low-level output voltage ready signal outputted by the fourth D-type flip-flop is triggered by a front-porch of the second trigger signal to change from low-level to high-level; when the low-level output voltage enable signal is at low-level, the low-level output voltage ready signal is reset to low-level.

15. The soft-start control circuit of claim 1, wherein the first resistor and the third resistor have the same resistance value and the second resistor and the fourth resistor have the same resistance value; when the high-level output voltage is greater than the input voltage and the high-level output voltage enable signal is high-level, the high-level output voltage control signal outputted by the NOR gate is high-level.

16. The soft-start control circuit of claim 3, wherein the high-level output voltage and a low-level output voltage are soft-started in a first soft-start process to a fourth soft-start process; when the high-level output voltage and the low-level output voltage are soft-started in overlapped time, the time multiplex circuit has a first time multiplexer mode to an eighth time multiplexer mode.

17. The soft-start control circuit of claim 16, wherein during the first soft-start process, the high-level output voltage enable signal changes from low-level to high-level, so that the high-level output voltage starts to increase, and the time multiplex circuit is switched from the first time multiplexer mode to the second time multiplexer mode; when the high-level output voltage has not completed soft-start, the low-level output voltage also starts to decrease, and the time multiplex circuit is switched from the third time multiplexer mode to the seventh time multiplexer mode.

18. The soft-start control circuit of claim 16, wherein during the second soft-start process, the low-level output voltage enable signal changes from low-level to high-level, so that the low-level output voltage starts to decrease, and the time multiplex circuit is switched from the first time multiplex mode to the fifth time multiplexer mode; when the high-level output voltage has not completed soft-start, the high-level output voltage also starts to increase, and the time multiplex circuit is switched from the fifth time multiplexer mode to the sixth time multiplexer mode.

19. The soft-start control circuit of claim 16, wherein during the third soft-start process, the high-level output voltage enable signal changes from low-level to high-level, so that the high-level output voltage starts to increase, and the time multiplex circuit is switched from the first time multiplexer mode to the second time multiplexer mode; after the high-level output voltage has completed soft-start, the low-level output voltage is started, and the time multiplex circuit operates in the fourth time multiplexer mode.

20. The soft-start control circuit of claim 16, wherein during the fourth soft-start process, the low-level output voltage enable signal changes from low-level to high-level, so that the low-level output voltage starts to decrease, the time multiplex circuit is switched from the first time multiplexer mode to the fifth time multiplexer mode; after the low-level output voltage has completed soft-start, the high-level output voltage is started, and the time multiplex circuit operates in the fifth time multiplexer mode.

* * * * *